United States Patent [19]

Yasuda et al.

[11] Patent Number: 4,947,398
[45] Date of Patent: Aug. 7, 1990

[54] LASER DEVICE WITH WAVELENGTH STABILIZATION CONTROL AND METHOD OF OPERATING THE SAME

[75] Inventors: Kenichi Yasuda; Hitoshi Wakata; Hajime Nakatani, all of Amagasaki, Japan

[73] Assignee: Mitsubishi Denki Kabushiki Kaisha, Japan

[21] Appl. No.: 372,834

[22] Filed: Jun. 29, 1989

[30] Foreign Application Priority Data

Oct. 20, 1988 [JP] Japan ................................ 63-262877
Jan. 13, 1989 [JP] Japan ..................................... 1-4767
Feb. 14, 1989 [JP] Japan ................................... 1-32768

[51] Int. Cl.$^5$ ............................................. H01S 3/10
[52] U.S. Cl. ........................................ 372/29; 372/32
[58] Field of Search ........................ 372/29, 31, 20, 32, 372/92, 98

[56] References Cited

U.S. PATENT DOCUMENTS

4,081,765 3/1978 Berg et al. ............................. 372/20
4,159,453 6/1979 Brandt et al. ......................... 372/20

FOREIGN PATENT DOCUMENTS

63-228693 9/1988 Japan.
PCT/JP88/0-
    1102 10/1988 PCT Int'l Appl..

OTHER PUBLICATIONS

Pol et al., "Excimer Laser-Based Lithography: A Deep Ultraviolet Wafer Stepper", 1986, vol. 633, pp. 6–16.
McKee, "Spectral-Narrowing Techniques for Excimer Laser Oscillators", Jun. 1984, vol. 63, pp. 214–219.

Primary Examiner—James W. Davie
Attorney, Agent, or Firm—Leydig, Voit & Mayer

[57] ABSTRACT

Methods of controlling the wavelength and output power of a laser device with two intracavity etalons are disclosed, together with a wavelength monitor capable of detecting sidebands. A method is characterized by the usage of hot/cold parameter K which takes two values 0 and 1 indicating the cold and hot state of the device, respectively. The parameter K, which is reset to 0 at the start, is set to 1 when the laser beam is stabilized; it is reset to 0, whenever the lasing pause exceeds a predetermined time length. Preparatory starting steps are performed or omitted at the start, depending on the value of K. Another method is characterized by the adjustment of the intracavity etalons during the lasing pauses, in accordance with exponential functions with thermal time constants. The sideband detecting wavelength monitor comprises a single etalon whose free spectal region $FSR_m$ is selected with respect to that, $FSR_2$, of the fine tuning intracavity etalon in such a manner that the interference fringes of the sidebands formed by the monitor etalon are distinct from each other and from those of the central wavelength $\lambda_0$. Namely, when i is the integer which is associated with a sideband wavelength $\lambda_S$ via the equation: $\lambda_S = \lambda_0 + i \times FSR_2$, the free spectral regions $FSR_2$ and $FSR_m$ are selected in such a manner that the apparent wavelength differences: $R = i \cdot FSR_2 + j \cdot FSR_m$ between the central wavelength $\lambda_0$ and the sideband wavelengths $\lambda_S$, wherein j is an integer which minimizes the value of R for each i, are different from zero and from each other.

21 Claims, 15 Drawing Sheets

FIG. 1
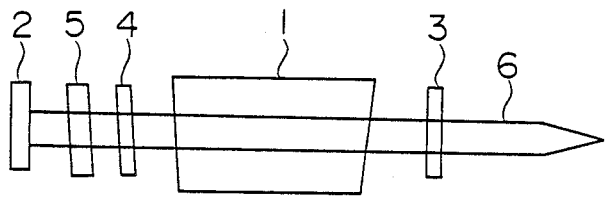
FIG. 2a
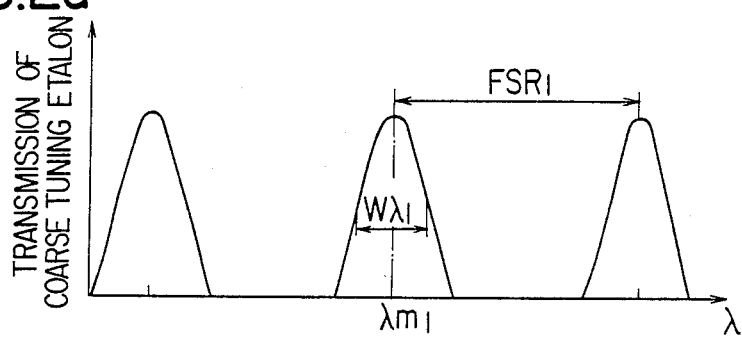
FIG. 2b
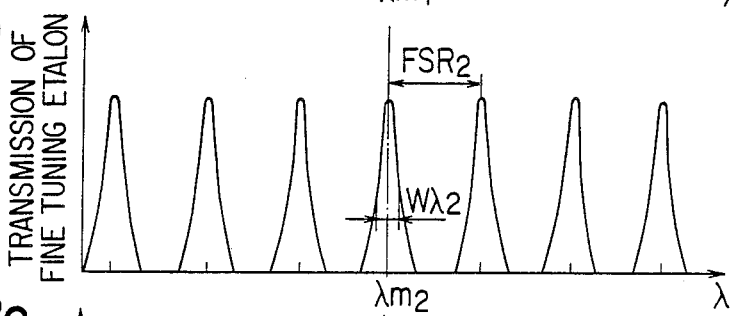
FIG. 2c
FIG. 2d
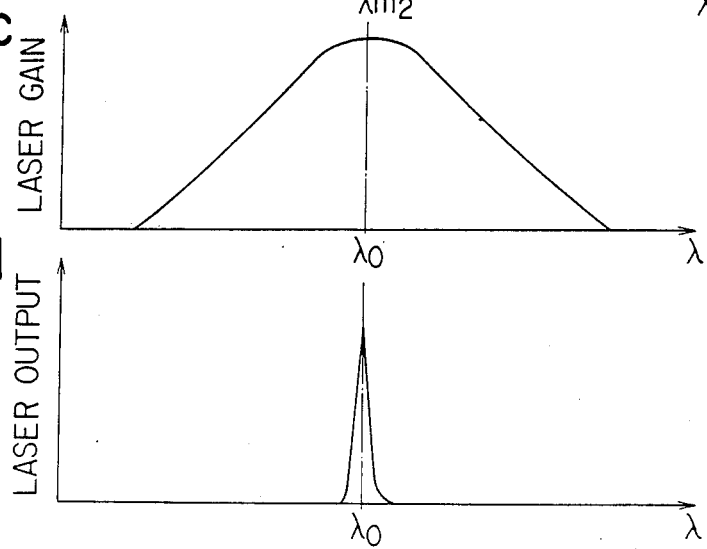
SETTING WAVELENGTH

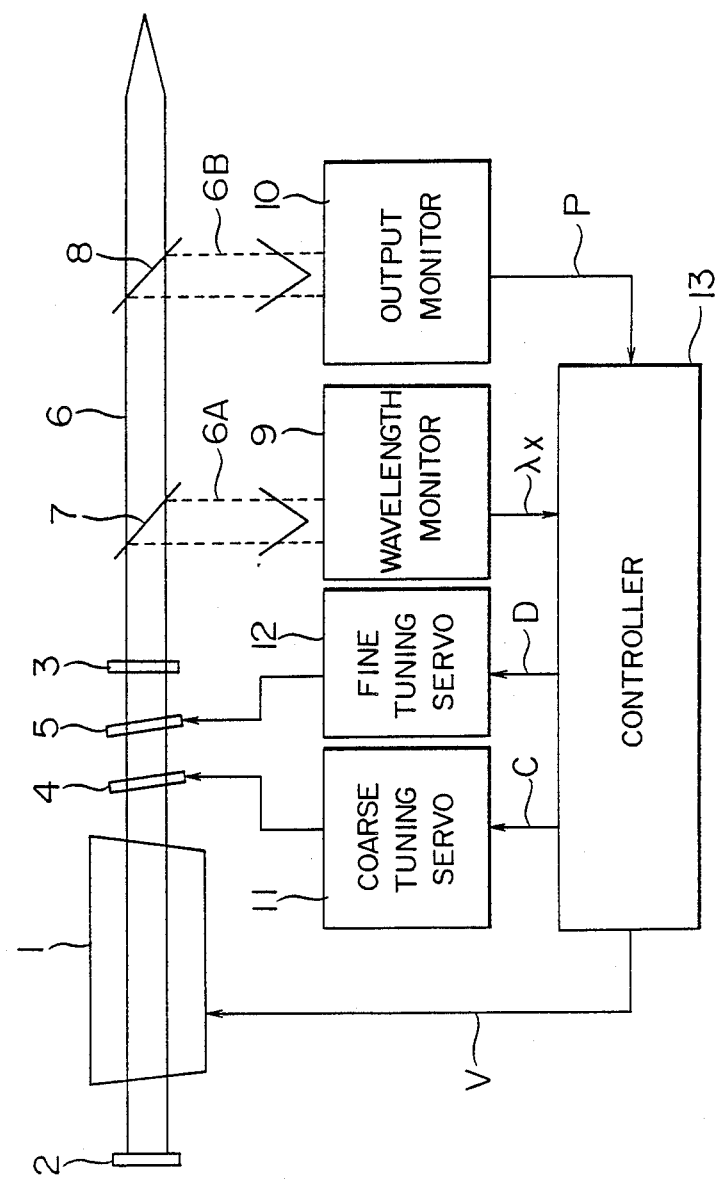

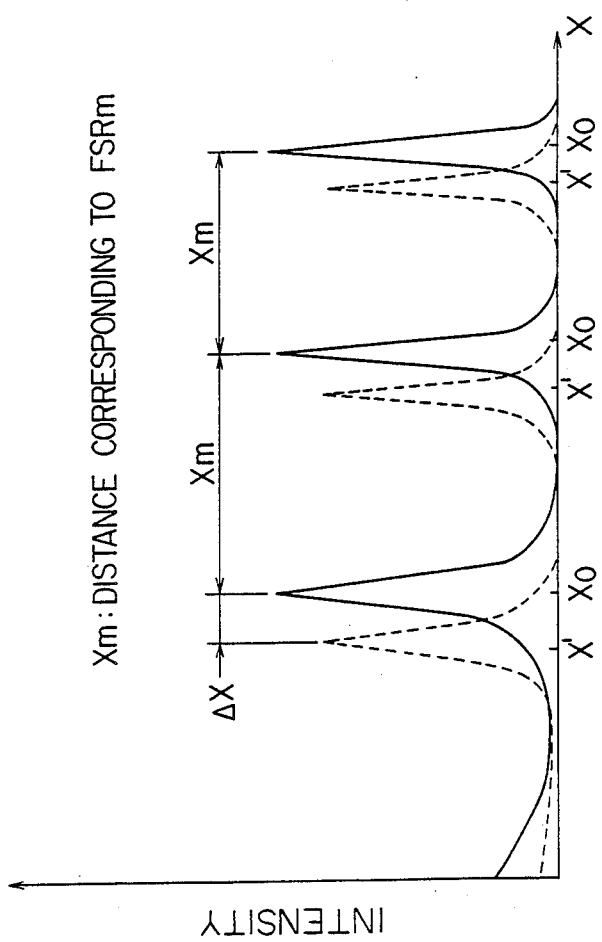

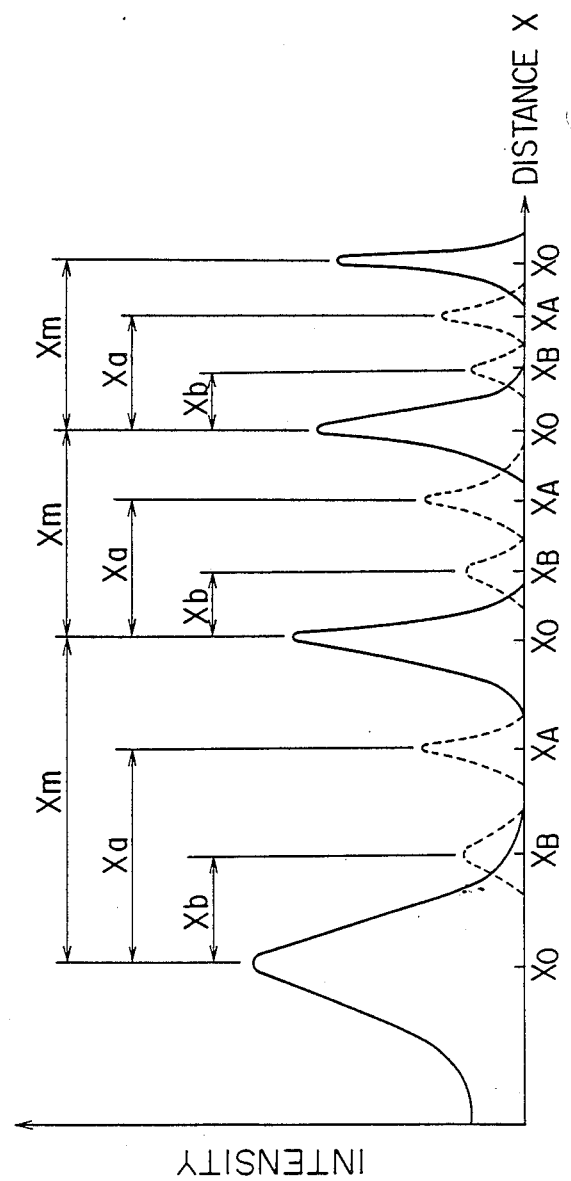

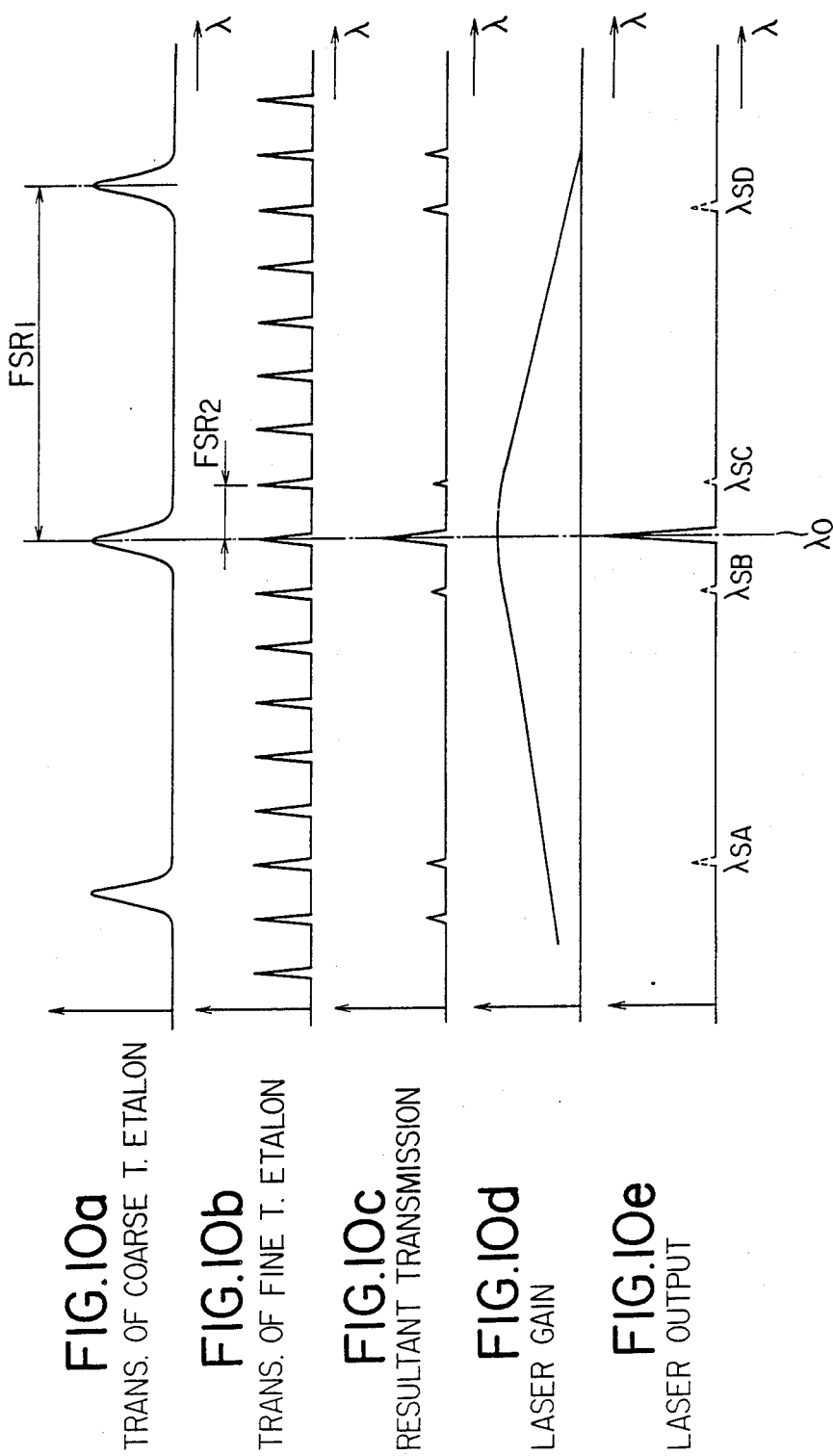

LASER DEVICE WITH WAVELENGTH STABILIZATION CONTROL AND METHOD OF OPERATING THE SAME

BACKGROUND OF THE INVENTION

This invention relates to laser devices with wavelength and output power stabilization control and to methods of operating the same; more particularly, it relates primarily to such laser devices with at least two spectral narrowing elements, such as etalons, and to methods of operating them.

Recently, excimer lasers are attracting attention as the light source for exposure tools, such as steppers, for the production of integrated circuits. They are capable of generating light in a shorter ultraviolet wavelength region than conventional mercury light sources; for example, a KrF excimer laser generates light at the wavelength of 248 nm, which is far shorter than even the I line of the mercury at 365 nm. Thus, they are capable of achieving a degree of resolution in the production of integrated circuits, which has hitherto been considered impossible.

It is, however, difficult to build a refractive optical system with chromatic corrections in the extremely short wavelength range of the excimer lasers. On the other hand, the bandwidth of the excimer lasers are relatively large; for example, a KrF excimer laser produces light with a bandwidth in the order of 1 nm in the normal operation mode. Thus, reduction of the bandwidth of excimer lasers is necessary, if they are to be used as a light source for the optical system of wafer steppers, etc. As a result, excimer lasers having spectral narrowing elements have already been proposed, in which dispersive elements such as etalons, diffraction gratings, or prisms are disposed in the oscillator optical cavity in addition to the laser medium for generating the laser beam.

FIG. 1 shows the structure of a laser device having two intracavity etalons as spectral narrowing elements, which is described, for example, in T. J. McKee: "Spectral-narrowing technique for excimer laser oscillators," Can. J. Phys. vol 63, 214 (1985), pp. 214 through 219. The laser device comprises a laser medium (such as KrF excimer) 1, a totally reflecting mirror 2 disposed to one side of the medium 1, and a partially reflecting mirror (output coupler) 3 disposed to the other side of the medium 1; the medium 1 and the total and partial mirrors 2 and 3 constitute a laser oscillator (oscillator optical cavity). Fabry-Perot etalons 4 and 5 are disposed as spectral narrowing elements in the laser optical cavity, from which the laser beam 6 is emitted via the partial mirror 3. The surfaces of the etalons 4 and 5 are slightly tilted from a direction at right angles with the optical path of the laser, for the purpose of preventing total reflections. The etalons 4 and 5 consist of parallel glass plates partially silvered on their inner surfaces so that the incoming light is reflected back and forth between the two inner surfaces before being transmitted therethrough; the separation between the partially silvered inner surfaces of the coarse tuning etalon 4 is smaller than that of the fine tuning etalon 5. Due to the interference of the laser light passing therethrough, the etalons 4 and 5 act as band-pass filters with a plurality of transmission peaks, as explained below.

The operation of the laser device of FIG. 1 is as follows: When the laser medium 1 is excited by a voltage applied thereacross, coherent light is generated therein by repeated excitation and transition of the material (such as an excimer) of the laser medium 1. The light thus generated in the medium 1 is amplified in the optical cavity during the time in which it travels back and forth many times between the total and partial mirrors 2 and 3, to be ultimately emitted through the partial mirror 3 as a laser beam 6 at a predetermined output level.

In the case of an excimer, semiconductor, or dye laser, or certain kinds of solid state lasers, the oscillation frequency or wavelength width (i.e. bandwidth) of the laser generated by the medium 1 itself is relatively wide; as mentioned above, however, the bandwidth can be reduced by inserting spectral narrowing dispersive elements in the oscillator optical cavity. Thus, in the case of the device of FIG. 1, coarse and fine tuning etalons 4 and 5 are inserted in the cavity as spectral narrowing elements. The two etalons act essentially as band-pass filters. The fine tuning etalon 5 has high resolution (i.e. the width of the pass bands thereof is small) but includes a plurality of transmission peaks within the laser amplification band; the coarse tuning etalon 4 has a lower resolution and is used to select one of the transmission peaks of the fine tuning etalon 5. The detail of the spectral narrowing by the two etalons 4 and 5 is as follows.

FIGS. 2(a) and 2(b) show the spectral characteristics of the optical elements of the laser device shown in FIG. 1. Namely, FIG. 2 (a) shows the transmission characteristics of the coarse tuning etalon 4, wherein the transmission (i.e. the ratio of the intensity of light transmitted through the etalon) of the etalon 4 is shown as a function of the wavelength λ plotted along the abscissa; 2(b) shows the transmission characteristics of the fine tuning etalon 5 in the same manner; (c) shows the laser gain profile of the laser medium 1 as a function of the wavelength λ; (d) shows the output spectral characteristics of the laser beam 6 which has undergone the spectral narrowing via the intracavity etalons 4 and 5.

FIGS. 2(a) and 2(b), the wavelengths λm at the peaks of the transmission of the etalons 4 and 5 are given by:

$$\lambda m = 2 \cdot n \cdot d \cdot \cos\theta / m, \tag{1}$$

wherein n is the refractive index of the material disposed between the two partially silvered surface of the etalon, d is the separation between the two silvered surfaces of the etalon, $\theta$ is the angle of incidence of light to the etalon, and m is an integer corresponding to the order of the etalon. The wavelengths λm at the peaks of the transmission of the coarse tuning etalon 4 are represented by $\lambda m_1$ in FIG. 2(a); those of the fine tuning etalon 5 by $\lambda m_2$ in FIG. 2(b). (In both diagrams 2(a) and 2(b), only the wavelength of the transmission peak shown at the center in the figure is labelled with $\lambda m_1$, and $\lambda m_1$; Each transmission peak in FIG. 2(a) and 2(b) correspond to one of the values of the integer m.) The wavelengths λm at the transmission peaks in the neighborhood of laser oscillation band correspond to a value of about $10^3$ of the integer m; thus, the separations between the peaks along the abscissa λ are substantially equal to each other in the figure. The wavelengths $\lambda m_1$ and $\lambda m_2$ at the peaks of the transmission of the coarse and fine tuning etalons 4 and 5, respectively, can be varied arbitrarily by changing the values of the parameters appearing in equation (1), i.e., the values of the reflectance n of the material between the silvered surfaces of the etalon, the separation d between the silvered surfaces of the etalon, and the angle of incidence $\theta$ of light to the surface of the etalon.

Further, the free spectral region FSR between adjacent peaks of the transmission of the etalons (which is represented by $FSR_1$ and $FSR_2$ in FIG. 2(a) and 2(b), respectively) is given by:

$$FSR = \lambda m^2/2 \cdot n \cdot d \cdot \cos\theta = \lambda m/m, \quad (2)$$

while the half level width $W\lambda$ (which is represented by $W\lambda_1$ and $W_2$ in FIGS. 2(a) and 2(b), respectively) of each peak is given by:

$$W\lambda = FSR/F, \quad (3)$$

wherein F is a variable called finesse, whose value is determined by the parameters (such as the area) of the etalons; the value of the finesse F of the intracavity etalons is usually about 20 at most.

On the other hand, the laser gain profile of the laser medium 1, such as the excimer laser medium, is extended over a relatively wide wavelength band, as shown by a bell-shaped curve having an extended bottom at FIG. 2 (c). The laser gain profile represents the amplification gain characteristics of the medium 1: if no spectral narrowing elements such as etalons 4 and 5 are disposed in the oscillator optical cavity, the laser beam 6 amplified over the whole gain range (the wavelength range over which the gain profile is extended) is emitted via the partial mirror 3.

The spectral narrowing by the coarse tuning etalon 5 is effected as follows. Namely, the parameters of the etalon 5 are selected in such a manner that the following two conditions are satisfied: first, a wavelength $\lambda m_1$ at one of the peaks of the transmission coincides with an arbitrary predetermined wavelength $\lambda_0$ set within the gain range (FIG. 2(c) shows the case where the setting wavelength $\lambda_0$ is at the center of the gain region); second, the free spectral range $FSR_1$ of the etalon 4 between its peaks of the transmission is wide enough to ensure that other peaks of the transmission do not fall within the gain range of the laser medium 1. Under these two conditions, only the light whose wavelength is within the pass band that includes the setting wavelength $\lambda_0$ is transmitted through the etalon 5 and thus amplified in the oscillator optical cavity between the two mirrors 2 and 3.

However, the spectral narrowing by the insertion of one coarse tuning etalon 4 alone is limited. Namely, if the spectral narrowing is to be effected, the free spectral region $FSR_1$ of the etalon 4 must be wide enough to ensure that only one of the wavelengths $\lambda m_1$ at the peaks of the transmission of the etalon 4 falls within the gain region of the laser medium 1. On the other hand, the value of the finesse F in equation (3) above is about 20 at most. Thus, the half level width $W\lambda_1$ given by equation (3), which corresponds to the width of the pass band of the etalon 4, cannot be made smaller than a certain minimum value.

The bandwidth of the laser beam 6 can be further narrowed by the addition of the fine etalon 5 as follows. Namely, the the parameters of the etalon 5 are selected in such a manner that the following two conditions are satisfied: first, one of the wavelengths $\lambda m_2$ at the peaks of the transmission of the etalon 5 coincides with the setting wavelength $\lambda_0$; and second, the free spectral region $FSR_2$ between the peaks of the transmitting characteristics of the etalon 5 satisfies the inequality:

$$FSR_2 \geq W\lambda_1,$$

wherein $W\lambda_1$ is the half width of the transmission peaks of the coarse tuning etalon 4. With the addition of the fine tuning etalon 5 satisfying the above two conditions, the spectral profile of the output laser beam 6 is narrowed and contracted around the setting wavelength $\lambda_0$ as shown in FIG. 1(d).

Further spectral narrowing of the laser beam 6 can be accomplished by an insertion of still another fine tuning etalon, if desired, in a manner similar to the above.

By the way, when two etalons 4 and 5 are utilized, the design of the coarse tuning etalon 4 is made easier if the free spectral regions $FSR_1$ and $FSR_2$ of the etalons 4 and 5 satisfy approximately the following equation:

$$FSR_1 = (k + \tfrac{1}{2})FSR_2, \quad (4)$$

wherein k is an arbitrary integer (FIGS. 2(a) and 2(b) show the case where k is equal to 2). Namely, when the free spectral regions $FSR_1$ and $FSR_2$ satisfy approximately the above equation (4), spectral narrowing to the band around setting wavelength $\lambda_0$ can be realized even if the free spectral region of the coarse tuning etalon 4 is narrower than the gain region of the laser medium 1.

As described above, the laser generated in the laser medium 1 having the amplification gain profile shown in FIG. 6(c) undergoes spectral narrowing via the etalons 4 and 5, through which the laser light goes back and forth many times during the amplification in the optical cavity; thus, the laser in the oscillator optical cavity is amplified in the narrow wavelength band centered around the setting, wavelength $\lambda_0$, which coincides with the wavelengths $\lambda m_1$ and $\lambda m_2$ of one of the peaks of the transmission of the etalons 4 and 5. Since the light is transmitted through the etalons 4 and 5 a number of times, the bandwidth of the output laser beam 6, shown at FIG. 2 (d), is narrowed down to from $\tfrac{1}{2}$ to 1/10 of the bandwidth which is obtained by the etalons 4 and 5 in the case where the laser light passes only once therethrough.

These laser devices, however, have problems with respect to the stability of frequency or wavelength of the laser beam. As discussed in the article by T. J. McKee cited above, the short term stability of the laser beam 6 can be enhanced by the improvement of the optical oscillator cavity or by reducing the incidence angle $\theta$ to the etalons 4 and 5; however, in the long term stability performance, the thermal effects, especially the wavelength shifts resulting from the heat generated by the laser beam 6 going through the etalons 4 and 5, present a major problem.

FIGS. 3(a) and 3(b) show the thermal shift of the peaks of the transmission of the coarse and the fine tuning etalons 4 and 5, respectively; FIG. 3(c) shows the shift in the wavelength band of the output laser beam 6 which results from the shifts in the transmission characteristics of the etalons 4 and 5 shown in FIGS. 3(a) and 3(b).

As shown in solid curves, the wavelengths $\lambda m_1$ and $\lambda m_2$ at the transmission peaks of the etalons 4 and 5, respectively, are aligned with the setting wavelength $\lambda_0$ immediately after the lasing is started. When, however, the etalons 4 and 5 are deformed due to the heat generated by the laser light going through them, the separation d between the silvered surfaces of the etalons changes; as a result, the transmission peaks of the etalons 4 and 5 are shifted by widths $\Delta\lambda_1$ and $\Delta\lambda_2$, respectively, from the positions shown by solid curves to the positions shown in dotted curves in FIGS. 3(a) and 3(b), respectively. As easily derived from equation (1) above, the shift width $\Delta\lambda$ of the transmission of the etalons is given by:

$$\Delta\lambda = (\lambda m/d) \cdot \Delta d, \quad (5)$$

wherein $\Delta d$ is the change in the separation d between the silvered surfaces of the etalons. Thus, the shift $\Delta\lambda$ is positive (i.e. the transmission peaks are translated toward right in the figure) when the change $\Delta d$ of the separation d is positive (i.e. the separation d increases); conversely, the shift $\Delta\lambda$ is negative when the change $\Delta d$ is negative.

As is apparent from equaion (5) above, the shift width $\Delta\lambda_1$ of the transmission peaks of the coarse tuning etalon 4 with a smaller separation $d_1$ is larger than the shift width $\Delta\lambda_2$ of the transmission peaks of the fine tuning etalon 5 with a larger separation $d_2$; namely:

$$|\Delta\lambda_1| \geqq |\Delta\lambda_2|.$$

Thus, the peak transmission wavelength $\lambda m_1$ of the coarse tuning etalon 4 is deviated further from the setting wavelength $\lambda_0$ than the peak transmission wavelength $\lambda m_2$ of the fine tuning etalon 5; thus, it follows that $$\lambda m_1 \neq \lambda m_2.$$

As a result, the spectrum of the output laser beam 6 centered at the setting wavelength $\lambda_0$, represented by the solid curve in FIG. 3 (c) is translated to the band, represented by the dotted curve therein, centered at the peak transmission wavelength $\lambda m_2$ of the fine tuning etalon 5. Further, the resultant transmission that results from the combination of the transmissions of the coarse and fine tuning etalons 4 and 5 decreases when the transmission peaks are translated from the positions shown by solid curves to those shown by dotted curves in FIGS. 3(a) and 3(b); consequently, the output power level at the central wavelength decreases by $\Delta P$ as shown in FIG. 3(c).

In addition to the shift in the output wavelength of the laser beam 6 described above, oscillations at sidebands may take place when the shift width $\Delta\lambda_1$ of the wavelengths $\lambda m_1$ of the transmission peaks of the coarse tuning etalon 4 becomes large. Namely, as shown in dotted curves in FIG. 3(f), sideband outputs at wavelengths $\lambda_{SA}$ and $\lambda_{SB}$ are generated at positions corresponding to the bands at which one of the transmission peaks of the fine tuning etalon 5 is overlapped with a transmission band of the coarse tuning etalon 4, as shown in FIGS. 3(d) and 3(e).

With regard to the suppression of the generation of light at sideband wavelengths, V. Pol et al.: SPIE Vol. 633, Optical Microlithography V (1986) or Japanese Laid-Open Patent Application No. 63-228693, for example, proposes a laser device provided with a wavelength monitor mechanism which controls the intracavity etalons to suppress the osicillation at sideband wavelengths. The former proposes to utilize two monitor etalons in the wavelength monitor mechanism; and one of the two monitor etalons is used to detect the variation of the central wavelength of the laser beam, while the other is used to detect the sideband wavelengths, the intracavity etalons thereby being controlled on the basis of the detected wavelengths. On the other hand, the latter proposes to utilize an etalon in the wavelength monitor which has a free spectral region wider than those of the intracavity etalon; the wavelength of the laser beam is controlled on the basis of the intensity ratio of the central to the sideband wavelength.

These laser devices, however, have disadvantages. The disadvantage of the former is this: it utilizes two monitor etalons; thus, the structure of the device becomes complicated. On the other hand, the disadvantage of the latter is this: it controls the intracavity etalon on the basis of the intensity ratio of the sideband and central wavelength outputs of the laser beam; thus, the control becomes impossible when the sidebands disappear completely; in addition, since the amplification gain profile of the laser medium 1 varies with the change in its pressure or composition, the reference ratio on which the control is based must be adjusted accordingly. Further, in the case of the latter, since the free spectral region of the monitor etalon thereof is wide, it is impossible to determine the shift of the wavelength with high precision on the basis of the interference fringes formed by the monitor etalon. Namely, in the case where the sideband wavelengths $\lambda_{SA}$ and $\lambda_{SB}$ are generated due to the shift $\Delta\lambda_1$ in the transmission peaks of the coarse tuning etalon 4, as shown in FIGS. 3(f), the deviations of these sideband wavelengths $\lambda_{SA}$ and $\lambda_{SB}$ from the central wavelength is substantially greater than the width of the shift $\Delta\lambda_2$ of the central wavelength from the setting wavelength $\lambda_0$. Thus, it is difficult to determine uniquely the sideband wavelengths $\lambda_{SA}$ and $\lambda_{SB}$ from the pattern of the interference fringes formed by the monitor etalon: if they are to be determined uniquely, the free spectral region of the monitor etalon must be set at a magnitude approximately equal to the width of the gain region of the laser medium. However, the gain region of the KrF excimer laser medium, for example, is not less than 400 pm; on the other hand, although the structure of the monitor etalon allows that the finesse F thereof be made greater than that of the intracavity etalons, the value of its finesse F is 50 at most. As a result, the half level width of the monitor etalon, which corresponds to its resolution of the wavelength detection, cannot be made smaller than about 8 pm. Thus, the detection of the central wavelength with high precision by means of the monitor etalon becomes impossible.

Thus, in the case of the former, the central and sideband wavelengths are detected separately by two monitor etalons. On the other hand, in the case of the latter, the ratio of the intensities at the central and sideband wavelengths are utilized in the wavelength control instead of the wavelengths themselves.

The disadvantages of conventional laser devices with spectral narrowing elements may be summarized as follows. First: the output power and the wavelength of the laser beam become unstable due to the thermal shifts of the transmission characteristics of the intracavity etalons when the laser oscillation is started or is started and stopped repeatedly; thus, laser devices of higher output power could not be put to practical use, since the intracavity etalons are subjected to heat generated by the high energy laser beam in the case of such devices. Second: in the case where the laser device comprises two or more intracavity etalons, sideband outputs may appear in the laser beam when the transmission peaks of the coarse tuning etalon is shifted due to its thermal deformation, etc.; since the wavelengths of the sidebands are deviated far away from the central setting wavelength of the laser beam, it is extremely important to detect and monitor the generation of these sidebands and suppress them as quickly as possible when they are detected. The conventional laser devices, however, are either incapable of sideband detection, or need a complicated structure for the detection of the sidebands.

SUMMARY OF THE INVENTION

A primary object of this invention, therefor, is to provide a method of controlling a laser device, especially a high output power laser device with two or more spectral narrowing elements, such as Fabry-Perot etalons, whereby the output power level and the wavelength of the laser beam can be quickly stabilized immediately after the laser oscillation is started or when the laser oscillation is started and stopped repeatedly.

Another object of this invention is to provide a laser device which comprises a wavelength monitor of a simple structure that is capable of detecting sideband wavelengths as well as the central wavelength of the laser beam, wherein the wavelength monitor can detect the wavelengths with high precision.

A further object of the invention is to provide a method of controlling a laser device including a wavelength monitor which is capable of detecting sideband wavelengths.

According to a first aspect of this invention, a method of controlling a laser device is provided, by which the wavelength and the starting of laser oscillation. The method is characterized in the usage of a hot/cold parameter K which takes two values, 0 and 1, that indicate the cold and the hot state of the laser device, respectively. When the laser device is started afresh, the parameter K is initialized to 0 indicative of the cold state of the laser device. When, on the other hand, the output power and the wavelength of the laser beam generated by the laser device are controlled to their respective predetermined levels after the start of a laser oscillation, the parameter K is set to 1 indicative of the hot state of the laser device. Further, when the laser oscillation is stopped, the value of the parameter K is reset 0, as soon as the time length during which the laser oscillation has been stopped exceeds a predetermined length of time. Thus, the parameter K is always set at a value which indicates the current state of the laser device. Before starting laser oscillation, the state of the laser device, i.e., whether it is hot or cold, is determined from the current value of the parameter K, and depending on the result of the determination of the state of the laser device, system starting preparatory steps are performed or omitted. During the system starting preparatory steps the laser device is warmed up and prepared by a preliminary oscillation before the laser beam is supplied to an associated exterior optical system, such as the optical system of a wafer stepper, etc. Thus, the laser device is started with preparatory starting steps when it is in the cold state; it is started quickly without such steps, when it is in the hot state.

Another method of controlling a laser device of this invention is characterized in the adjustment of the parameters of the intracavity etalons, such as the separation d between the silvered surfaces thereof, during the time in which the laser oscillation is stopped. The adjustment of the parameters of the intracavity etalons are effected continually in accordance with the fall of the temperature of the etalons; for example, they are effected on the basis of exponential functions with a thermal time constant. Further, the total values of the controlled variables with respect to the parameters of the etalons are adjusted before the laser oscillation is started again. Thus, when the laser device is started again, the wavelength and the output power level of the laser beam is stabilized immediately after the start without delay.

According to a further aspect of this invention, a laser device with a coarse tuning spectral narrowing element and a fine tuning etalon is provided; the device according to this aspect includes a wavelength monitor that is capable of detecting sideband wavelengths as well as the central wavelength of the laser beam from the interference fringes that are formed on an image sensor by a portion of the laser beam by means of a monitor etalon. The sideband wavelengths are generated at transmission peak wavelengths of the fine tuning etalon which are deviated from the central setting wavelength of the laser beam; thus, the free spectral regions of the intracavity fine tuning etalon and the monitor etalon are selected at values at which the apparent wavelength differences R between the sideband wavelengths and the central setting wavelength, with respect to the interference fringes formed on the image sensor, are different from zero. This is equivalent to the condition that the sidebands can be detected separately from the central setting wavelength, since the apparent wavelength differences R correspond to the distance between interference fringe peaks formed by the sideband wavelengths and those formed by the central setting wavelength. It is preferred that the apparent wavelength differences are different from one another, so that each sideband can be detected separately.

According to still another aspect of this invention, a method of controlling a laser device including a wavelength monitor capable of sideband detection is provided. The generation of sidebands, which is due to the change of spectral characteristics of the coarse tuning spectral narrowing element, considerably widens the effective bandwidth of the laser beam; bandwidth widening is quickly suppressed according to this aspect of this invention.

The novel features which are believed to be characteristic of this invention is set forth with particularity in the appended claims. This invention itself, however, both as to its organization and method of operation, together with further objects and advantages thereof, may best be understood from the detailed description of the preferred embodiments, taken in connection with the accompanying drawings.

BRIEF DESCRIPTION OF THE DRAWINGS

FIG. 1 is a diagrammatic side view of a laser device having two intracavity etalons as spectral narrowing elements;

FIGS. 2(a) to 2(d) show spectral characteristics of the etalons and the laser medium of the device of FIG. 1, together with that of the output laser beam thereof;

FIGS. 3(a) to 3(f) show the shifts in the spectral characteristics, caused by thermal deformation etc., of the intracavity etalons, wherein FIGS. 3(a) to 3(c) show the mechanism of the shift of the central wavelength of the laser beam while FIGS. 3(d) to 3(f) show the mechanism of the generation of sidebands in the laser beam;

FIG. 4 is a block diagram showing the organization of a laser device controlled according to this invention;

FIG. 6 shows the interference fringes formed by the monitor etalon of the wavelength monitor of FIG. 5;

FIG. 9 shows the relationship between the interference fringes formed by the sideband wavelengths and those formed by the central wavelength of the laser beam, the fringes being formed by the monitor etalon of the wavelength monitor;

FIGS. 10(a) to 10(e) show the spectral characteristics of a laser device with two intracavity etalons, wherein four sidebands may be generated simultaneously;

In the drawings, like reference numerals and characters represent like or corresponding portions, variables, or steps, as the case may be, unless stated otherwise.

DETAILED DESCRIPTION OF THE PREFERRED EMBODIMENTS

Figure 3A:
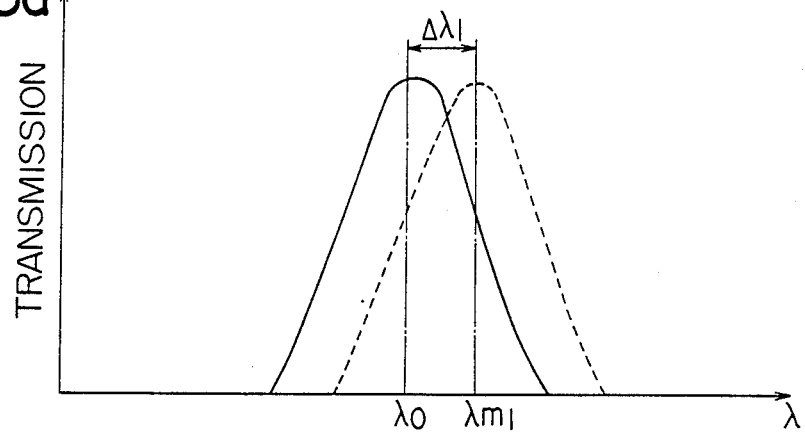

In the following, the organization of the laser devices with spectral narrowing elements and methods of operating them according to this invention are described referring to the drawings.

(A) Fundamental Organization of the Laser Device

FIG. 4 shows the organization of the laser device having two etalons as spectral narrowing elements; the laser device comprises a controlling mechanism which controls and stabilizes the wavelength and output power of the laser beam according to this invention.

The lasing optical cavity has a structure similar to that shown in FIG. 1: the optical cavity between the totally reflective mirror 2 and the partially reflective mirror 3 comprises, in addition to the laser medium (such as KrF excimer laser medium) 1, a coarse tuning etalon 4 and a fine tuning etalon 5 as dispersive spectral narrowing elements. The coarse and fine tuning etalons 4 and 5 are Fabry-Perot etalons which have transmission peaks similar to those shown in FIGS. 2(a) and 2(b) respectively. Thus, as described above in reference to FIG. 2, a laser beam 6 narrowed in bandwidth as shown in FIG. 2(d) is outputted from the output coupler, i.e. partial mirror 3, in operation. By the way, it is noted that a parameter of the etalons 4 and 5 (such as the separation d between the partially reflective surfaces thereof or the angle of incidence, $\theta$, of the laser light to the surface thereof) affecting the positions of the transmission peaks thereof can be adjusted so that the thermal shift of the transmission peaks can be compensated for; for example, the etalons 4 and 5 comprise a piezoelectric element between the inner silvered surfaces thereof as a spacer, so that the separation d therebetween may be adjusted by a voltage signal applied thereto; alternatively, the separation d is adjusted by varying the pressure inside the container in which the etalons are sealed. As seen from equation (1) above, the positions of the transmission peaks of the etalons 4 and 5 can be adjusted by controlling the separation d or the angle of incidence $\theta$ of the laser beam to the surfaces of the etalons.

On the other hand, the controlling mechanism of the device has the following organization. A portion of the laser beam 6 is reflected by beam splitters (partial mirrors) 7 and 8. A wavelength monitor 9 determines a position of an interference fringe pattern corresponding to the wavelength of the laser beam 6, utilizing the split beam 6A, reflected by the beam splitter 7, and outputs wavelength information $\lambda x$ to a controller 13. The organization and principle of operation of the wavelength monitor 9 are described in detail below. On the other hand, an output power monitor 10, which comprises a photodetector such as a photodiode, determines the output power level of the laser beam 6 on the basis of the split beam 6B reflected by the beam splitter 8, and outputs output power level information P to the controller 13. The controller 13, which comprises a CPU and a memory and controls the whole system of the laser device, outputs, in response to the output power information P, a voltage command V to the laser medium 1 and a coarse tuning command C to the coarse tuning servo mechanism 11. The coarse tuning servo mechanism 11 adjusts a parameter, such as the separation $d_1$ of the coarse tuning etalon 4 in accordance with the command C. Further, in response to the wavelength information $\lambda x$, the controller 13 outputs a fine tuning signal D to the fine tuning servo mechanism 12; the fine tuning servo mechanism 12 adjusts a parameter, such as the separation $d_2$ of the fine tuning etalon 5 in accordance with the command D. Thus, the positions of the transmission peaks of the etalons 4 and 5 are controlled and stabilized by the servo mechanism 11 and 12, respectively; the control of the separation d between the silvered surfaces of the etalons may be effected by varying the pressure inside the containers in which the etalons are sealed.

Figure 5:
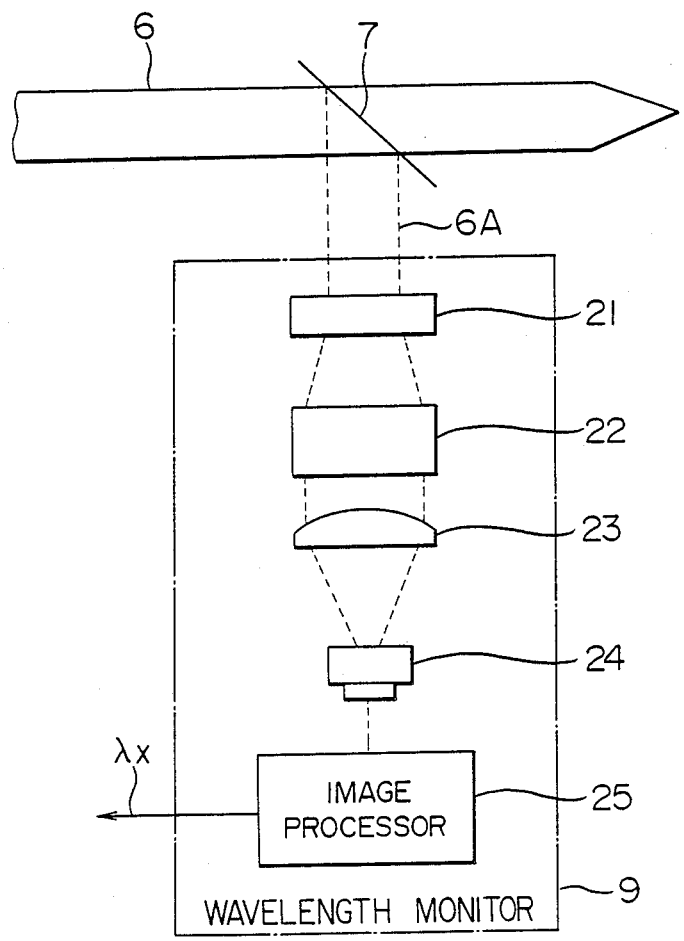
FIG. 5 is a diagramatic side view of the wavelength monitor of the laser device of FIG. 4.

FIG. 5 shows the detailed structure of the wavelength monitor mechanism 9 of FIG. 4. The beam 6A split by the beam splitter 7 is weakened and diffused (scattered) by an integrator 21, which comprises a neutral density (ND) filter for weaking the light incident thereon, a diffusing plate for diffusing the laser light, and an interference filter for averaging the wavelength distribution of the laser light. The light thus diffused and weakened by the integrator 21 is dispersed by a monitor etalon 22. The monitor etalon 22 consists of a Fabry-Perot etalon having a half width $W\lambda$ that is smaller than that of the fine tuning etalon 5. The finesse F of the monitor etalon 22 is set, for example, at 50; the free spectral region FSRm thereof, on the other hand, is set at a value smaller than the free spectral region $FSR_2$ of the fine tuning etalon 5; for example, FSRm is set at 25 pm, compared with $FSR_2$ at 80 pm. The converging lens 23 converges the light from etalon 23 on an image sensor 24 to form interference fringes thereon corresponding to the wavelength of the laser beam 6. The image sensor 24 consists of a linear array of photosensitive elements such as photodiodes which are disposed on the focal plane of the lens 23 along a radial direction. A picture or image processor 25 coupled to the output of the image sensor 24 analyses the interference fringes on the sensor 24 to output the wavelength information signal λx.

By the way, in the above structure of the wavelength monitor, the monitor etalon 22 may be replaced by other dispersive elements which are capable of separating the laser light into wavelength components by refraction or diffraction; such dispersive elements include diffraction gratings, prisms, and Fizeau interferometers, as described, for example, in IEEE Journal of Quantum Electronics, QE-14 (78) 17.

The principle of operation of the wavelength monitor mechanism 9 of FIG. 5 is as follows.

The beam 6A split at the beam splitter 7 is weakened and diffused (or scattered) by the integrator 21. The etalon 22 has transmission peaks at the wavelengths λm which are determined by the equation (1) cited above in the introductory part of this specification:

$$\lambda m = 2nd \cdot \cos \theta / m. \quad (1)$$

Thus, it has transmission characteristics similar to that shown in FIG. 2 (b), wherein the free spectral region FSRm thereof is even smaller than the free spectral region $FSR_2$ of the fine tuning etalon 5 so that the resolution of the wavelength detection may be improved. On the other hand, the spectrum of the laser beam 6 is confined to a narrow band around the setting wavelength $\lambda_0$ as shown in FIG. 2(d), when the laser device is operating properly. Thus, in the above equation (1), the wavelength λm of the light incident on the etalon 22 is substantially equal to the setting wavelength $\lambda_0$; the angle of incidence θ, on the other hand, varies over a range, since the light incident on the etalon 22 is diffused beforehand by the integrator 21. (The refractive index n and the separation d between the inner reflective surfaces of the etalon 22 are fixed.) Thus, as can be easily deduced from equation (1) above, only the laser light which is incident on the etalon 22 at certain discrete (or separate) values of the angle of incidence θ is transmitted through the etalon 22.

Thus, the light converged by the lens 23 on the image sensor 24 forms an interference fringe pattern as shown in a solid curve in FIG. 6, wherein the intensity of light is plotted against the distance X from the optical axis of the lens 23, which distance X is plotted along the abscissa. If the focal length of the converging lens 23 is represented by f, the light incident on the lens 23 at the incidence angle θ is converged on the focal plane at a position separated from the optical axis of the lens 23 by a distance X equal to fθ:

$$X = f\theta.$$

Thus, the lens 23 forms circular interference fringes on the focal plane thereof, on which the image sensor 24 lies, wherein the distances $X_0$ of the peak intensities each correspond to the discrete values of the incidence angle θ of the light which coresond to the transmission peaks of the etalon 22. Further, since the wavelength is fixed in equation (1) above, each peak position $X_0$ corresponds to a distinct value of the order m of the etalon 22. (Namely, each one of the peak positions $X_0$ is associated a value of the order m, which increases or decrease by unity as one moves to left or right to the next peak in the figure.)

On the other hand, the distances Xm shown in FIG. 6 between the peak positions $X_0$ of the fringes correspond to the free spectral region FSRm of the etalon 22.

Namely, when the wavelength λ of the laser beam 6 changes by a width Δλ as shown in FIG. 3 (c), the peak positions $X_0$ of the interference fringes are translated together by a distance ΔX corresponding to the shift width Δλ, as shown in a dotted curve in FIG. 6, wherein the new peak-positions are designated by X'. This distance ΔX of the translation of the interference fringes is related to the variation Δθ of the incidence angle by the equation:

$$\Delta X = f \cdot \Delta\theta,$$

wherein f is the focal length of the lens 23. The value of Δθ can be calculated from equation (1) above; namely, it is equal to the variation (i.e. increment and decrement) of θ which corresponds to the shift Δλ of the wavelength λm in equation (1). Thus, when the shift Δλ of the wavelength λ of the laser beam 6 becomes equal to the free spectral region FSRm of the etalon 22, the shift distance ΔX of the interference fringes becomes substantially equal to the distance Xm between the peaks of the fringes. Namely, when the shift Δλ of the wavelength λ of the laser beam 6 becomes equal to the free spectral region FSRm of the etalon 22, the new positions X' of the interference peaks substantially coincide with their previous positions $X_0$ at the setting wavelength $\lambda_0$.

The free spectral region FSRm of the etalon 22 is therefore selected at a value greater than the expected value of the wavelength shift Δλ of the laser beam 6, which is equal to the value of the wavelength shift $\Delta\lambda_2$ of the transmission peaks of the fine tuning etalon 5, as described above in reference to FIGS. 3(a) to 3(c).

Thus, the wavelength λ of the laser beam 6 can be determined uniquely from the position or distance $X_0$ of one of the peaks of the interference fringes. Namely, the distance $X_0$ of a peak corresponds to an angle of incidence θ by the relation described above:

$$X_0 = \theta f,$$

wherein f is the focal length of the lens 23; thus, the angle of incidence θ can be determined from the distance $X_0$. On the other hand, each one of the peaks of the interference fringes corresponds a fixed value of the integer m corresponding to the order of the etalon 22. Thus, in the above equation (1), the angle θ is a known variable while the order m is a fixed constant; the wavelength λ of the laser beam 6 can therefore be calculated from equation (1).

On the other hand, the resolution (or precision) of the detection of the wavelength is inversely proportional to the free spectral region FSRm of the monitor etalon 22. Thus, the free spectral region FSRm must be set at a smaller value to improve the resolution of the wavelength detection. When, for example, the free spectral region FSRm of the monitor etalon 22 is 25 pm and its finesse F is 50, the resolution of wavelength detection is about 0.5 pm, as seen from equation (3) above.

By the way, the interference fringe pattern formed on the linear image sensor 24 comprises noise (small fluctuations of intensity) in addition to the clear interference pattern shown in FIG. 6. Thus, the image processor 25 effects an image processing operation on the output of the linear image sensor 24 to remove noise components from the interference fringe pattern. Further, the image processor 25 outputs wavelength information λx corresponding to the positions X of the interference fringe peaks or to the shift distance $\Delta X$ thereof. Thus, the controller 13 determines the wavelength $\lambda$ of the laser beam 6 following the procedure described above, on the basis of the wavelength information signal $\lambda x$ outputted from the wavelength monitor 10.

Further, it is noted that the output power level of the laser beam 6 can also be determined, in addition to the wavelength $\lambda$ thereof, from the interference fringe pattern formed on the image sensor 24. Namely, the height of the peaks of the interference fringes corresponds to the output power level of the laser beam 6; thus, the output power level of the laser beam 6 can be determined from the height of the peaks. On the other hand, the height of the peaks of the intensity of the fringe pattern can be determined by the processor 25 on the basis of the output of the linear image sensor 24. As a result, the wavelength monitor 9 may combine the function of the output monitor 10 in addition to its proper function of wavelength determination.

(B) Method of Operating the Laser Device

Figure 7A:
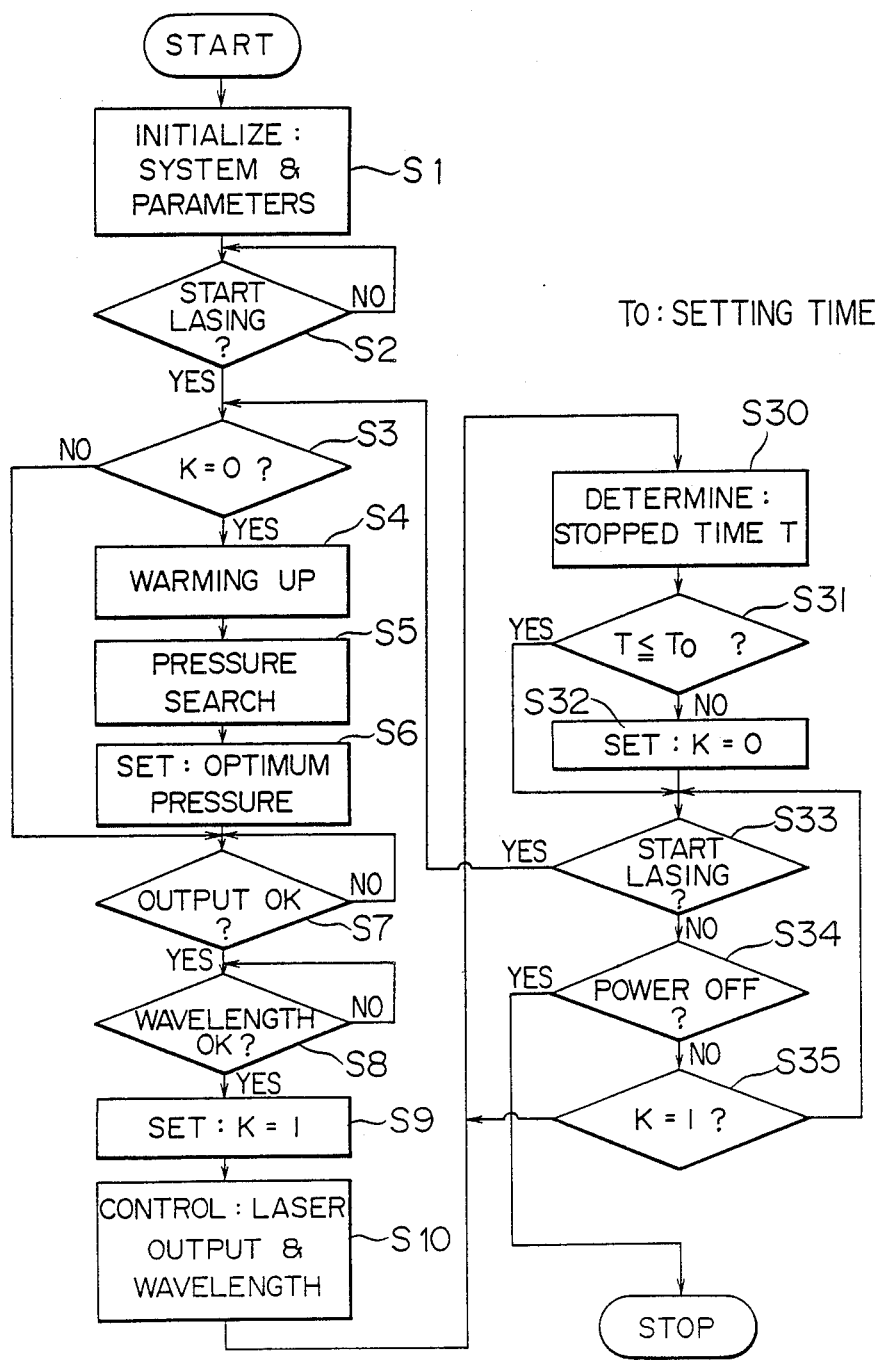
FIGS. 7a and 7b are flowcharts showing the steps followed by a laser device controlling method according to this invention, which is characterized by the usage of the hot/cold parameter K.
Figure 7B:
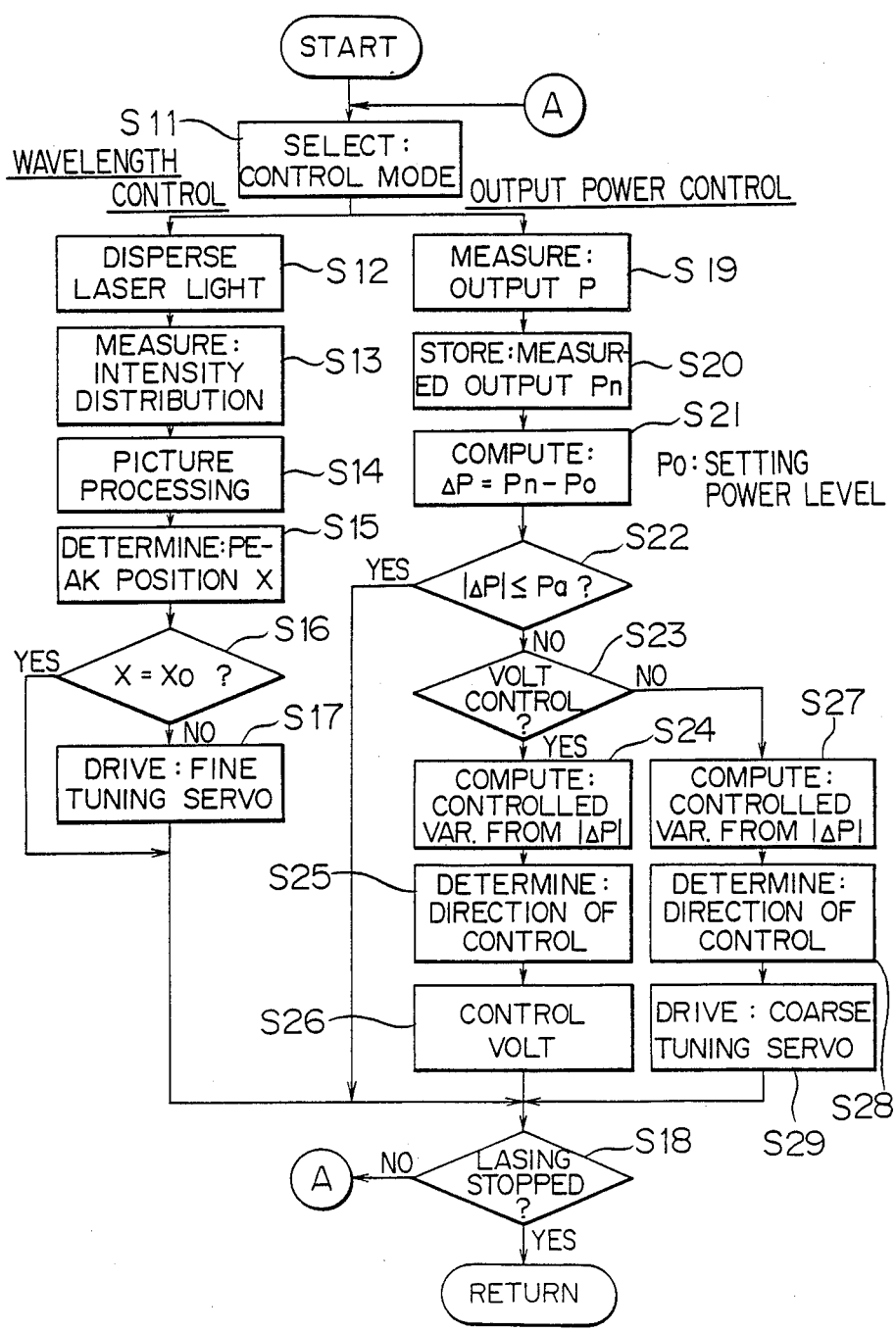

Referring now to FIGS. 7a and 7b of the drawings, a method of operating the laser device of FIG. 4 according to this invention is described. The method is characterized by the utilization of a hot/cold parameter K which takes two values 0 and 1 representing the cold and the hot state of the laser device respectively; on the basis of the value of the parameter K, a decision is made as to whether preparatory starting steps are necessary or not. Namely, when the value of the parameter K is 0, the preparatory steps are performed before outputting the laser beam; on the other hand, when the value of the parameter K is 1, the preparatory steps are omitted. Thus, the laser beam which is unstable in the wavelength because of the thermal deformations of the intracavity etalons is not supplied to an exterior optical system. Further, the wavelength and the output power level of the laser beam are quickly stabilized after the start of lasing according to this method.

Referring first to FIG. 7a, let us describe the steps which include the preparatory starting steps and the procedure for setting and resetting the value of the hot/cold parameter K. The steps for controlling the wavelength and the output power level of the laser beam are described later referring to FIG. 7b.

When the power source of the laser device system is turned on, the system and the parameters (including the parameter K) are initialized at step S1, and the start of lasing is waited for at step S2. When it is determined, at step S2, that the lasing is to be started, a further determination is made at step S3 as to whether the value of the parameter K is 0 (i.e. cold) or 1 (i.e. hot). When the parameter K is equal to 1, the program proceeds directly to step S7. On the other hand, when the parameter K is equal to 0, the preparatory starting steps S4 through S6 are performed before proceeding to the step S7. (As will become clear from the description below, the parameter K is equal to 1 when the system is in the hot start, i.e. the laser device is being started after a short interval of the off period; the parameter K is equal to 0 when the system is in the cold start, i.e. the laser device is started after a sufficient period of cooling time.)

When it is judged at step S3 that the value of the parameter K is equal to 0, the preparatory starting steps S4 through S6 are effected as follows.

First, at step S4, warming up procedures are performed as follows: Maintaining the voltage applied across the laser medium 1 at a constant level, the fine tuning etalon 5 is controlled by means of the wavelength monitor 9 and the fine tuning servo mechanism 12, so that the wavelength $\lambda$ of the laser beam 6 is controlled and stabilized to agree with the setting wavelength $\lambda_0$; further, the coarse tuning etalon 4 is placed in an uncontrolled state, or alternatively, the output power level of the laser beam 6 is maximized by means of the output monitor 10 and the coarse tuning servo mechanism 11. By the way, the procedures followed in the control of the coarse and fine tuning etalons 4 and 5 are described below in reference to FIG. 7b.

Next, at step S5, a searching control, such as a pressure search control, for optimizing the parameters (such as the separation d between the silvered surfaces thereof) of the coarse tuning etalon 4 is effected by means of the output monitor 10 and the coarse tuning servo mechanism 11; namely, the optimum value of the separation $d_2$ between the silvered surface of the etalon 4, or of the angle of incidence, $\theta_2$, of laser light thereto, at which the output power of the laser beam 6 is maximized, is determined by varying the pressure inside the container thereof or by varying the angle it forms with the optical axis of the laser device. Finally, at step S6, the inner pressure or the angle of the coarse tuning etalon 4 is set at the optimum level thereof at which the output power of the laser beam 6 is maximized, on the basis of the result of the search control effected at step S5. (The figure shows the case in which the pressure is varied at step S5 and the pressure is set at the optimum level at step S6.)

Following the preparatory steps S4 through S6 (in the case of the cold start), or directly after the step S3 (in the case of the hot start), further starting steps S7 thorough S9 are performed, which are followed by step 10 at which the output power and wavelength of the laser beam 6 supplied to an exterior optical system is controlled until lasing in the optical cavity is stopped. Namely, at step S7, it is determined whether or not the output power level of the laser beam 6 is contained within a predetermined range with respect to a predetermined setting level. Further, at step S8, it is determined whether or not the wavelength $\lambda$ of the laser beam 6 is within a predetermined range with respect to the setting wavelength $\lambda_0$. When both the output power level and the wavelength are controlled within their respective predetermined ranges, the parameter K is set at 1 at step 9. The control of the output power level and the wavelength of the laser beam 6 at steps S7 and S8 may be effected by means of the steps described below in reference to FIG. 7b.

By the way, during the time when the system starting steps S4 through S8 are performed, the supply of the laser beam 6 to an associated exterior optical system is prevented by means of a shutter (not shown in FIG. 4); thus, laser beam 6 which is unstable in output power level and wavelength is not supplied to the exterior optical system.

Thus, when the laser device is in the hot state and the parameter K is set at 1 at step S9, the laser beam 6 is outputted to the exterior optical system to be utilized therein. During the time in which the laser beam 6 is outputted, its output power level and the wavelength are controlled, at step S10, by the controller 13 within predetermined ranges with respect to their setting values. The steps followed by the controller 13 in the control of the output power level and the wavelength of the laser beam 6 are described below in reference to FIG. 7b.

When the lasing is stopped during the time in which step 10 is performed, steps S30 through S35, at which the value of parameter K is renewed, are performed by the controller 13. Namely, at step 30, the length of time T during which the lasing has been stopped is determined; further, at step S31, a determination is made as to whether the time T is no greater than a predetermined setting time length $T_0$, which is selected at a value that is long enough to render the laser device from the hot to the cold state. When the determination at step S31 is in the affirmative (i.e. $T \leq T_0$), the program proceeds to step S33; on the other hand, when the determination at step S31 is in the negative (i.e. $T > T_0$), the parameter K is set at 0 at step S32.

After performing the steps S30 through S32, a determination is made at step S33 as to whether the lasing is to be started or not; if it is determined that lasing is to be started, the program returns to step S3 to start the lasing anew; if not, a determination is made at the following step S34 whether the power source of the laser device system is to be turned off or not. If the determination at step S34 is in the affirmative, the laser device system is stopped; if it is in the negative, a further determination is made at step S35 as to whether the current value of the parameter K is equal to 1 or not. If the value of the parameter K is equal to 1, steps S30 through S32 are repeated to reset the value of the parameter K to 0, if necessary; on the other hand, if the value of the parameter K is determined to be equal to 0 at step S35, the program returns to step S33 at which judgement is made again as to whether the lasing is to be started or not.

Thus, at steps S30 through S35, the value of the parameter K is renewed continually until the system is stopped or the lasing is started anew. Namely, during the time in which steps S30 through S35 are repeated, whenever the length of the stopped time T exceeds the predetermined setting time length $T_0$, the value of K is reset to 0. As a result, if the lasing is started anew after an interval of stopped time T longer than the setting time $T_0$ (i.e. $T > T_0$), the value of the parameter K is reset to 0 at step S32 before the program proceeds to step 3; thus, the starting steps S4 through S8 are performed to prepare the system before the laser beam is outputted. On the other hand, if the lasing is started anew after an interval T shorter than the setting time $T_0$ (i.e. $T \leq T_0$), the value of the parameter K is still retained at 1 when its value is determined at step S3. Thus, preparatory starting steps S4 through S6 are omitted from the system starting prcedures, and only steps S7 and S8 are performed among them; thereafter, the program proceeds to steps S9 and S10 when the output power level and the wavelength of the laser beam 6 are controlled within predetermined ranges with respect to their setting values. Thus, the lasing is quickly stabilized according to the value of the hot/-cold parameter K, and unstable laser beam 6 generated during the starting period is not outputted to the exterior optical system. By the way, when the laser device system is to be started again after it is stopped as a result of an affirmative determination at step S34, the program starts at step S1 at which the value of the parameter K is reset to 0.

Referring now to FIG. 7b of the drawings, let us describe the procedure followed at step S10 of FIG. 7a, etc., in the output power level and wavelength control of the laser beam 6.

First, at step S11, selection of the control mode, i.e. selection as to whether the wavelength or the output power level control is to be effected, is made. However, the wavelength and the output power level control may be effected simultaneously; alternatively, the respective controls may be effected selectively at different times, for example, by means of the time division, as shown in the figure.

In the case where it is decided at step S11 that the wavelength control is to be effected, the laser beam 6A split by the beam splitter 7 is diffused at step S12 by the integrator 21 to be dispersed by the monitor etalon 22, so that interference fringes corresponding to the wavelength of the laser beam 6 are formed on the image sensor 24. Next, at step S13, in response to the output signal of the image sensor 24, the image processor 25 determines the linear distribution of the intensity of light incident along the image sensor 24, i.e. the interference fringe pattern formed on the sensor 24 as shown in FIG. 6. Further, at step S14, the image processor 25 effects an image processing operation on the output signal or the measurement data of the sensor 24; namely, the processor 25 effects, for example, smoothing of the measurement data for the purpose of removing the noise components contained therein. Next, at step S15, the peak intensity position or distance X (corresponding to a certain order m of the etalon 22) is determined by the processor 25; the controller 13 receives the distance X as the wavelength information signal $\lambda x$ corresponding to the wavelength $\lambda$ of the laser beam 6. At step S16, a determination is made as to whether or not the distance X is equal to the predetermined distance $X_0$ which corresponds to the setting wavelength $\lambda_0$; if the distance X is equal to $X_0$, the program proceeds directly to step S18, at which a determination is made as to whether the lasing is stopped or not; if, on the other hand, the distance X is not equal to $X_0$, the fine tuning etalon 5 is driven via the fine tuning servo mechanism 12. Namely, in response to the wavelength information $\lambda x$ outputted from the wavelength monitor 9, the controller 13 outputs the fine tuning command signal D to the fine tuning servo mechanism 12; thus, the separation $d_2$ between the inner silvered surfaces of the fine tuning etalon 5 is adjusted in such a manner that the peak transmission wavelength $\lambda m_2$ coincides with the setting wavelength $\lambda_0$. As a result, the wavelength $\lambda$ of the laser beam 6 is controlled to the setting wavelength $\lambda_0$ even if a thermal deformation of the fine tuning etalon 5 has taken place. After the step S17, a determination is made at step S18 as to whether lasing is stopped or not. If the determination at step S18 is in negative, i.e. if the lasing is not stopped, the program returns to step S11 to repeat the wavelength or the output power control steps.

On the other hand, when the output power control is selected at step S11, the output power level of the laser beam 6 is measured at step S19 by the output monitor 10 via the split beam 6B. Thus, the output monitor 10 outputs the output power information P to the controller 13, which, at step S20, determines the current output power level $P_n$ by taking an average of n successive values of the output information P, and stores the current output power level $P_n$. Further, at the next step S21, the difference: $\Delta P = P_n - P_0$, between the current power level $P_n$ and the predetermined target power level $P_0$ is calculated. At step S22, the absolute value of the difference $\Delta P$ is compared with a predetermined allowable error range Pa; if the absolute value of the difference ΔP is not greater than the allowable error range Pa (i.e. $|\Delta P| \leq Pa$), the program proceeds directly to step S18; if, on the other hand, the absolute value of the difference ΔP is greater than the allowable error Pa (i.e. $|\Delta P| > Pa$), the program proceeds to step S23, at which a determination is made as to whether the control that is to be effected subsequently is the control of voltage applied to the laser medium 1, or the control of the coarse tuning etalon 4.

If the voltage control is selected at step S23, steps S24 through S26 are performed to adjust the voltage applied across the laser medium 1. Namely, at step S24, the absolute value of the controlled variable (i.e. the variation of the voltage applied across the laser medium 1) is calculated from the absolute value $|\Delta P|$ of the difference or error ΔP; further, at step S25, the direction of the control (i.e. whether the applied voltage is to be increased or decreased) is determined from the polarity of the absolute value $|\Delta P|$ of the difference ΔP. On the basis of the absolute values of the controlled variable and the direction of control determined at steps S24 and S25, the controller 13 outputs the voltage command signal V corresponding thereto, so that the voltage applied across the laser medium 1 is controlled and adjusted accordingly.

Normally, priority is given to control of the voltage applied across the laser medium 1; however, if control of the coarse tuning etalon 4 is selected at step S23, steps S27 through S29 are effected. Namely, at step S27, the absolute value of the controlled variable (e.g. the variation of the inner pressure of the coarse tuning etalon 4) is calculated from the absolute value $|\Delta P|$ of the difference ΔP; further, at step S25, the direction of the control (e.g. whether the inner pressure is to be increased or decreased) is determined from the polarity of the absolute value $|\Delta P|$ of the difference ΔP. On the basis of the absolute values of the controlled variable and the direction of control determined at steps S27 and S28, the controller 13 outputs the coarse tuning command signal D to the coarse tuning servo mechanism 11, which, in response thereto, drives the coarse tuning etalon 4 accordingly, so that the separation $d_1$ between the inner surfaces thereof is adjusted to maximize the output power of the laser beam 6.

As described above, by means of the execution of the wavelength control steps S12 through S17 and the output power level control steps S19 through S29, the wavelength and output power level of the laser beam 6 are controlled to their target or setting values.

After the voltage control steps S24 through S26 and the control steps, S27 through S29, of the coarse tuning etalon 4, the program proceeds to step S18, at which a determination is made as to whether the lasing is stopped or not; when the lasing continued the program returns to step S11 to repeat the wavelength or the output power control as described above; when, on the other hand, a determination is made at step S18 that the lasing has stopped, the program proceeds to step S30 of FIG. 7a.

(C) Modified Method of Operation of the Laser Device

Figure 8A:
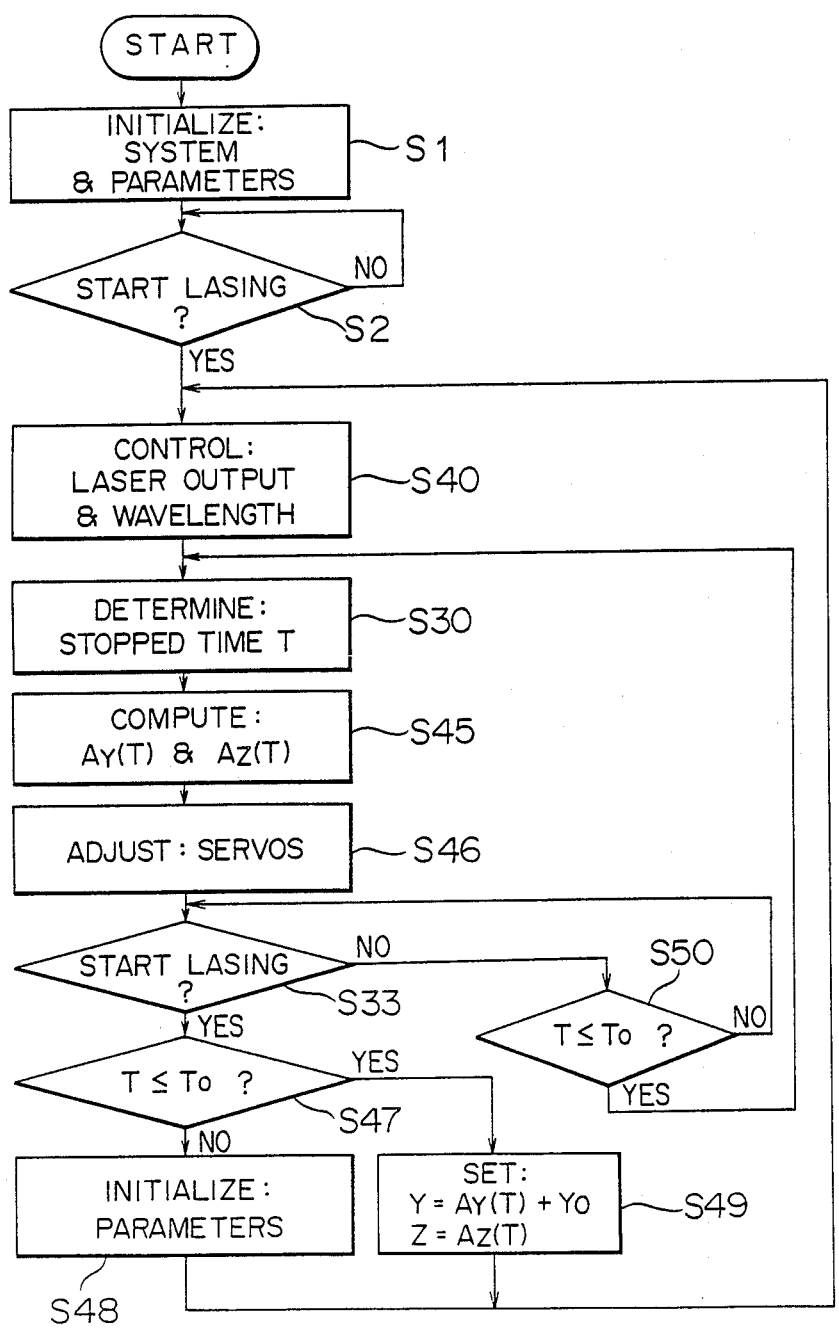
FIGS. 8a and 8b are flowcharts showing the steps followed by another controlling method according to this invention, which is characterized by the adjustment of the intracavity etalons during laser oscillation pauses.
Figure 8B:
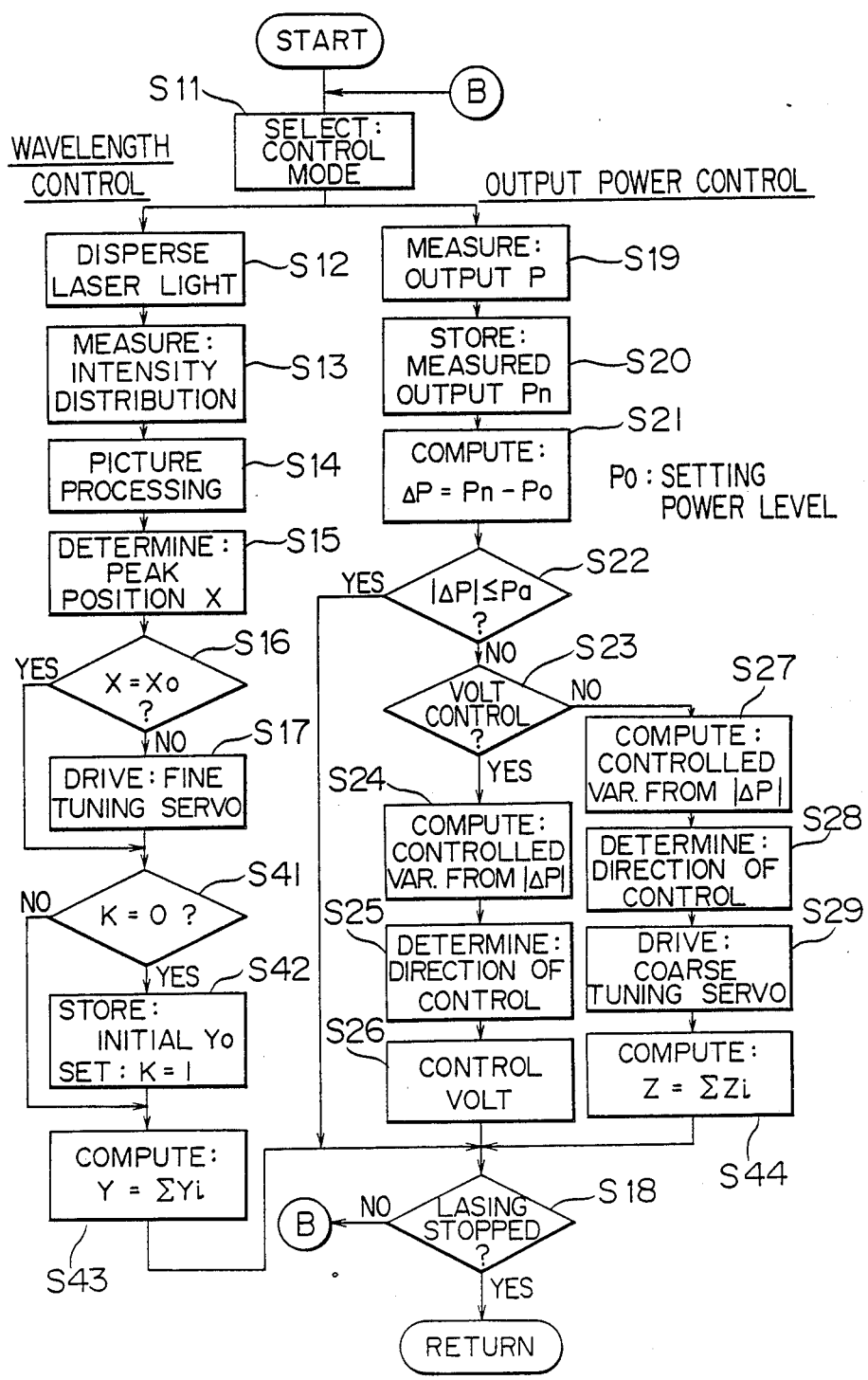

Referring next to FIGS. 8a and 8b of the drawings, another method of operating the laser device of FIGS. 4 and 5 is described. The steps S1, S2, S11 through S30, and S33 followed in this method correspond and are similar to the steps of FIGS. 7a and 7b designated by the same reference numerals; further, step S40 of this method corresponds to step S10 of FIG. 7a. Thus, in the following, description is limited in the main to the steps which are different from those followed in the procedure of FIGS. 7a and 7b. It is noted that this modified method is characterized by the precise and quick predictive adjustment of the parameters (such as the separation d between the inner silvered surfaces) of the etalons 4 and 5 during the period in which lasing is stopped.

First, as shown in FIG. 8a, the initialization step S1 is performed; thereafter, if a determination is made at step S2 in favor of starting the laser oscillation, the lasing control step S40 is effected. Step S40 comprises the procedure shown in FIG. 8b; thus, as shown in FIG. 8b, it comprises the wavelength control procedure via the fine tuning etalon 5 and the output power control procedure which is effected via the voltage applied across the laser medium 1 or via the adjustment of the inner pressure, etc., of the coarse tuning etalon 4.

The wavelength and output power control of lasing shown in FIG. 8b is similar to the procedure shown in FIG. 7b except for the following differences:

In the wavelength control procedure, after the fine tuning etalon 5 is adjusted at step S17, a determination is made at step S41 as to whether the value of the hot/cold parameter K is 0 or not. (As in the above case, the value 0 of the parameter K indicates the cold state of the laser device, while the value 1 indicates the hot state thereof.) When the value of K is equal to 1 at step S41, the program proceeds directly to step S43; on the other hand, when it is equal to 0, the initial value of the controlled variable (including the direction or polarity thereof) is stored at step S42 as the value of the variable $Y_0$, and, at the same step S42, the value of the parameter K is set at 1. Further, at step S43, the total value of the controlled variable, i.e. the sum of the variations Yi of the controlled variable in the preceding wavelength control cycles:

$$Y = \Sigma Y_i$$

is calculated. Thereafter, the program proceeds to step S18 at which a determination is made as to whether lasing has stopped or not.

In the output power control, on the other hand, after the coarse tuning etalon 4 is adjusted at step S29, the total value of the controlled variable, i.e. the sum of the variations Zi of the controlled variable in the preceding output power control cycles:

$$Z = \Sigma Z_i$$

is calculated. Thereafter, the program proceeds to step S18 at which a determination is made as to whether lasing is stopped or not.

When a determination is made at step S18 that the lasing is stopped, the program proceeds to step S30 of FIG. 8a, at which the stopped time T of lasing is calculated. Thereafter, at step S45, the adjustment values of the controlled variable, $A_y(T)$ and $A_z(T)$, for the fine and coarse tuning etalons 5 and 4, respectively, are calculated by the equations:

$$A_y(T) = Y \cdot \exp(-T/\tau_2), \text{ and}$$

$$A_z(T) = Z \cdot \exp(-T/\tau_1),$$

respectively, wherein $\tau_2$ and $\tau_1$ are thermal time constants of the fine and the coarse tuning etalons 5 and 4, respectively, and Y and Z are the total value of the controlled variables calculated above.

Thereafter, at step S46, the fine and the coarse tuning etalons 5 and 4 are adjusted according to the values of $A_y(T)$ and $A_z(T)$ via the respective servo mechanisms 12 and 11. Thus, even if the etalons 4 and 5 suffer thermal deformation due to a decrease in the temperature thereof after, lasing stops the servo mechanism 11 and 12 automatically adjusts the etalons 4 and 5, in accordance with the decrease in the temperatures thereof with the passage of time.

In the above description, the adjustment values of the controlled variables, $A_z(T)$ and $A_y(T)$, have been expressed in the form of an exponential function of the stopped time T with a time constant $\tau_1$ and $\tau_2$. However, the adjustment controlled variables $A_z(T)$ and $A_y(T)$ may be expressed as a combination of two exponential functions. Further, if they cannot be expressed in exponential functions, the dependence of the adjustment controlled variables $A_z(T)$ and $A_y(T)$ on the stopped time T may be determined experimentally; namely, the thermal characteristics of the etalons 4 and 5 (i.e. the temperature variation curve after the stoppage of lasing) are measured and stored in the controller 13 to determine the values of $A_z(T)$ and $A_y(T)$ corresponding to a value of the stopped time T.

When a determination is made, at the step S33 subsequent to the above step S46, that lasing is to be started, the stopped time T determined at step S30 is compared with the predetermined setting time $T_0$ at step S47. When T is greater than $T_0$, the parameters, including K, are initialized at step S48; on the other hand, when T is not greater than $T_0$, the total controlled variable Y and Z of the fine and the coarse tuning servo mechanisms 12 and 11, respectively, are adjusted to the respective values given by:

$Y = A_y(T) + Y_0$, and $Z = A_z(T)$.

When, on the other hand, a determination is made at step S33 that the lasing is not to be started, stopped time T is compared with the setting time $T_0$ at step S50. When the stopped time T is greater than $T_0$, the program returns to step S33; on the other hand, when the stopped time T is not greater than $T_0$, the program returns to step S30 to calculate the stopped time T afresh.

As described above, the total controlled variables Y and Z are adjusted in accordance with the length of the time T during which lasing is stopped. Thus, the output power and the wavelength of the laser beam 6 can be quickly stabilized even after the restarting of laser oscillation. As a result, the laser beam 6 that is unstable in wavelength and output power is not outputted to an exterior optical system in which it is utilized.

The steps followed while the lasing is stopped may be summarized as follows. By means of the cyclic procedure constituting of the steps S30, S45, S46, S33, and S50, the adjustment values of the controlled variables of the coarse and the fine tuning etalon 4 and 5 are continually renewed to the values which closely follow the decrease in the temperature of the etalons 4 and 5, and the etalons 4 and 5 are adjusted continually on the basis of these adjustment values of the controlled variables. When lasing is restarted after an interval of stopped time, the length of time T during which lasing has been stopped is compared at step S47 with a predetermined length of time $T_0$. If the time T is greater than $T_0$, all the parameters are initialized at step S48; on the other hand, when the time T is not greater than $T_0$, the total value of the controlled variables of the etalons 4 and 5 utilized in the subsequent lasing control steps is adjusted at step S49.

(D) Laser Device with Sideband Analysis

Figure 3B:
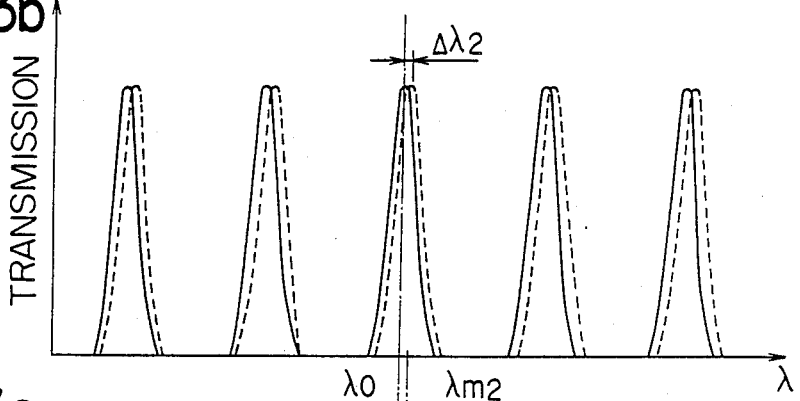
Figure 3C:
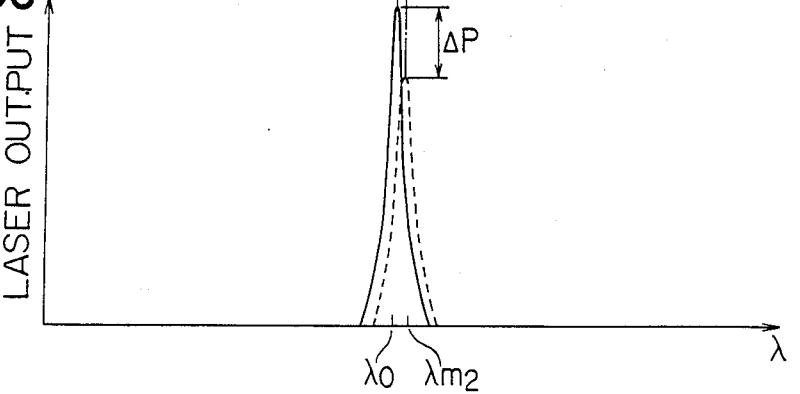

As described above in the introductory part in reference to FIG. 3b, sideband wavelength laser outputs may appear if the shift $\Delta\lambda_1$ of the transmission peaks of the coarse tuning etalon 4 becomes large. Further, when the finesse F of the coarse tuning etalon 4 becomes smaller due to its thermal deformation or deterioration of precision of the surfaces thereof, the half level width $W\lambda$ of its transmission peaks becomes greater; this may also result in the generation of sideband outputs in the laser beam 6. These sideband outputs appear at wavelengths which are far removed from the setting wavelength $\lambda_0$ of the laser beam 6. Thus, it is desirable to detect these sidebands of the laser beam 6 by the wavelength monitor 9, in addition to the central wavelength thereof, so that the shift $\Delta\lambda_1$ of the transmission peaks of the coarse tuning etalon 4 may be corrected and the generation of sidebands may be suppressed. In the case where the sidebands are due to the widening of the half level width $W\lambda$ of the coarse tuning etalon 4, a corrective steps must be taken to improve its performance.

Thus, in the following, the conditions which are required of the wavelength monitor 9 of FIG. 5 for the purpose of detecting the sideband outputs in the laser beam 6 are determined. As will become clear from the discussion below, the conditions which are necessary for the detection of sidebands are concerned with the value of the free spectral region FSRm of the monitor etalon 22 relative to the possible sideband wavelengths of the laser beam 6. In the following discussion of the conditions for the sideband detection, reference is made to FIGS. 4, through 6, in addition to those figures which are specifically mentioned.

Figure 3D:
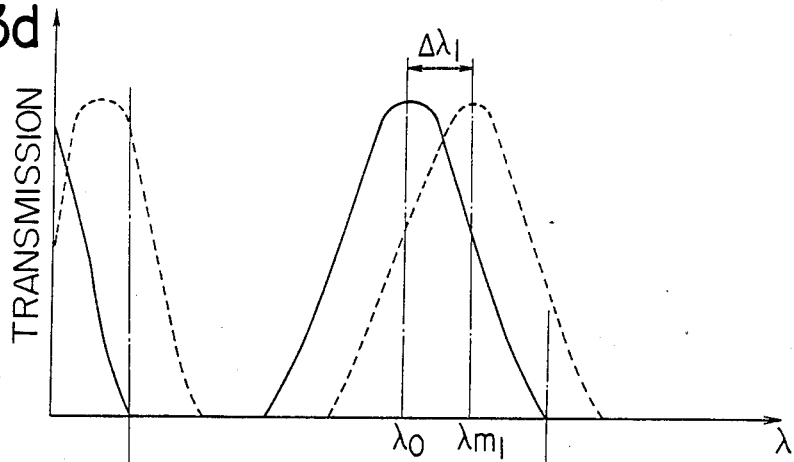

As described above in reference to FIG. 6, the interference fringes formed by the monitor etalon 22 correspond to the central wavelength $\lambda$ (which is designated by $\lambda_0$ hereinbelow, since the central wavelength $\lambda$ is approximately equal to the setting wavelength $\lambda_0$) of the laser beam 6 when the lasing is in the normal oscillation mode. However, due to a large shift $\Delta\lambda_1$ of the transmission peaks of the coarse tuning etalon 4 as shown in FIG. 3(d), sideband outputs at wavelengths $\lambda_{SA}$ and $\lambda_{SB}$ may appear in the laser beam 6 as shown in FIG. 3(f); when this happens, interference fringes corresponding to sideband wavelengths $\lambda_{SA}$ and $\lambda_{SB}$ are formed on the image sensor 24, as shown by dotted curves in FIG. 9. In FIG. 9, the peaks of the interference fringes corresponding to sideband wavelengths $\lambda_{SA}$ and $\lambda_{SB}$ are formed at positions or distances $X_A$ and $X_B$, respectively, which are spaced by distances Xa and Xb, respectively, from the adjacent peak positions $X_0$ of the interference fringes corresponding to the central wavelength $\lambda_0$ of the laser beam 6. When these distances Xa and Xb are equal to zero, the interference fringe peaks generated by sideband wavelengths $\lambda_{SA}$ and $\lambda_{SB}$, shown by dotted curves, are overlapped with those of the central wavelength $\lambda_0$ shown by the solid curve. In such case, the detection of sidebands becomes impossible. Further, if the distances Xa and Xb are equal to each other, the separate detection of the sideband wavelengths $\lambda_{SA}$ and $\lambda_{SB}$ becomes impossible. Thus, let us first determine the relationship between the sideband wavelengths and the positions of the interference fringes corresponding thereto.

Figure 3E:
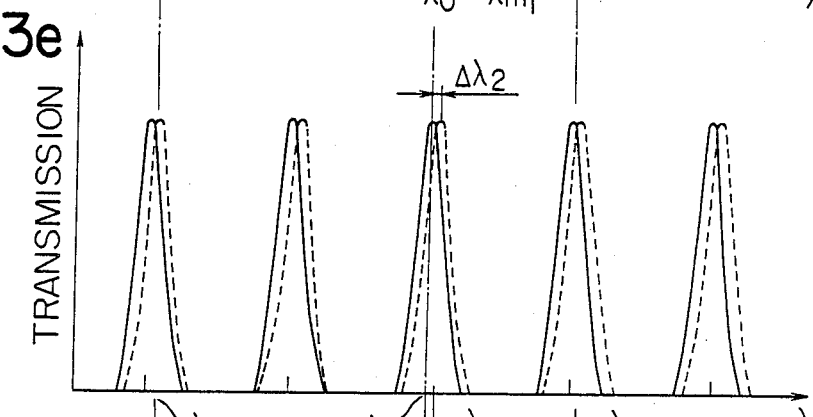
Figure 3F:
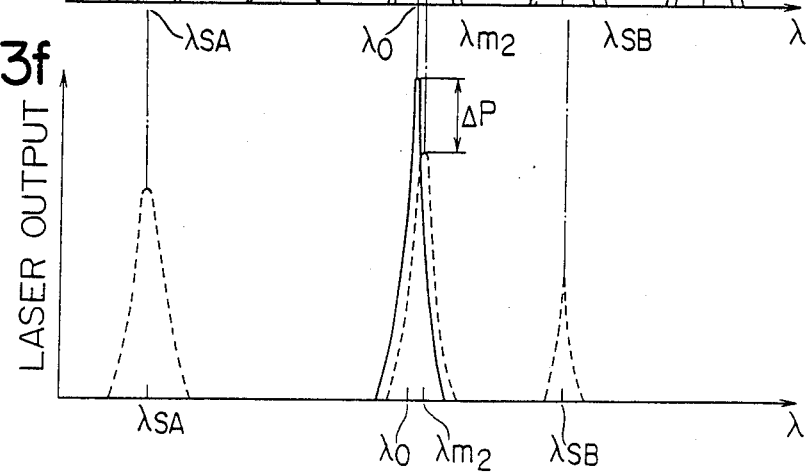

Let $\lambda_S$ be a sideband wavelength of the laser beam 6 which may be generated; namely let $\lambda_S$ be $\lambda_{SA}$ or $\lambda_{SB}$ shown in FIGS. 3(d) to 3(f). Further, let $X_S$ be the positions of the fringe peaks corresponding to the the sideband wavelength $\lambda_S$ of the laser beam 6; namely, let $X_S$ be the distances $X_A$ or $X_B$ shown in FIG. 9. As described above in reference to FIG. 6, the positions of the interference fringe peaks formed on the image sensor 24 of the wavelength monitor 9 by a wavelength $\lambda$ and those formed by another wavelength, $\lambda \pm $ FSRm, which is greater or smaller than the wavelength $\lambda$ by the free spectral region FSRm of the monitor etalon 22, substantially coincide. Thus, the distances $X_S$ corresponding to a sideband wavelength $\lambda_S$ and the distances $X_S'$ corresponding to another sideband wavelength $\lambda_S'$ coincide when the following equation holds:

$$\lambda_S' = \lambda_S + j \times FSRm, \quad (6)$$

wherein FSRm is the free spectral region of the monitor etalon 22 and j is an arbitrary integer.

Thus, the apparent wavelength $\lambda_S'$ of the sideband wavelength $\lambda_S$ detected by the wavelength monitor 9 is given by the same equation (6) above, wherein, however, j is the integer which minimizes the absolute value of the difference:

$$R = \lambda_S' - \lambda_0,$$

between the apparent wavelength $\lambda_S'$ and the central wavelength $\lambda_0$. This difference: $R = \lambda_S' - \lambda_0$, between the apprent wavelength $\lambda_S'$ and the central wavelength $\lambda_0$ corresponds to the distances Xs (e.g. Xa or Xb shown in FIG. 9) between the fringe peaks of the central wavelength $\lambda_0$ and those of the sideband wavelength $\lambda_S$. Namely, the constant R is the apparent wavelength difference between the central wavelength $\lambda_0$ and the sideband wavelength $\lambda_S$ which is detected by the wavelength monitor 9. Thus, a sideband wavelength $\lambda_S$ can be detected sepearately from the central wavelength $\lambda_0$ if and only if the apparent wavelength difference R is different from zero. Further, two sideband wavelengths can be detected separately as distinct from each other if and only if the values of the apparent wavelength R corresponding thereto are different from each other.

By the way, as explained above in reference to FIGS. 3(d) to 3(f), a sideband wavelength $\lambda_S$ appears at positions separated from the central wavelength $\lambda_0$ by an integral multiple of the free spectral region FSR$_2$ of the fine tuning etalon 5: $i \times FSR_2$; namely, sideband wavelength $\lambda_S$ can be expressed by the equation:

$$\lambda_S = \lambda_0 + i \times FSR_2, \quad (7)$$

wherein i is the integer associated with the sideband wavelength $\lambda_S$. For example, the integer i corresponding to the sideband wavelengths $\lambda_{SA}$ and $\lambda_{SB}$ shown in FIGS. 3(d) to 3(f) is equal to $-2$ and 1, respectively. On the other hand, the integer i corresponding to the sideband wavelengths which may appear when the transmission peaks of the coarse tuning etalon 4 are translated toward the left in FIGS. 3(d) to 3(f) is equal to $-1$ and 2, respectively. With each sideband wavelength $\lambda_S$ is associated a fixed value of the integer i, which is determined by the equation (7).

Thus, by substituting the right hand side of equation (7) in the place of $\lambda_S$ in equation (6) above, the difference, $R = \lambda_S' - \lambda_0$, between the apparent sideband wavelength $\lambda_S'$ and the central wavelength $\lambda_0$, can be expressed as follows:

$$R = i \times FSR_2 + j \times FSRm, \quad (8)$$

wherein i is the integer associated with the sidband frequency $\lambda_S$ by means of the equation (7) and j is the integer which minimizes the absolute value of R.

For example, let FSR$_2$ and FSRm be equal to 80 pm and 25 pm, respectively. Then the integer i corresponding to the sideband wavelength $\lambda_{SA}$ is equal to $-2$; thus, the integer j which minimizes the absolute value of the constant R is equal to 6, whereby the value of R is equal to:

$$R_A = (-2) \times 80pm + 6 \times 25pm = -10pm.$$

On the other hand, the sideband wavelength $\lambda_{SB}$ associated with i = 1 corresponds to the value $-3$ of the minimizing integer j; thus, the value of the constant R is given by:

$$R_B = 1 \times 80pm + (-3) \times 25pm = 5pm.$$

The meaning of the above result is this: the distances Xa and Xb shown in FIG. 9 correspond to apparent wavelength differences $-10$ pm and 5 pm, respectively, between the central and sideband wavelengths. In other words, the sideband wavelengths $\lambda_{SA}$ and $\lambda_{SB}$ form fringe peaks on the image sensor 24 of the wavelength monitor 9 at positions $X_A$ and $X_B$ which correspond to apparent wavelengths $\lambda_{SA}' = \lambda_0 - 10$ pm and $\lambda_{SB}' = \lambda_0 + 5$ pm, respectively.

The above discussion of the apparent positions of the fringe peaks formed on the image sensor 24 by the sideband wavelengths $\lambda_S$ may be summarized as follows: First: the apparent wavelength difference R detected by the wavelength monitor 9, between the central wavelength $\lambda_0$ and a sideband wavelength $\lambda_S$, is given by the equation (8) above, wherein i is the integer associated with the sideband wavelength $\lambda_S$ by means of the equation (7), and j is the integer which minimizes the absolute value of R. Second: a sideband wavelength $\lambda_S$ can be detected separately from the central wavelength $\lambda_0$ if and only if the apparent wavelength difference R is different from zero: $R \neq 0$; further, two sideband wavelengths can be detected separately and distinctly from each other if and only if the values of the apparent wavelength difference R corresponding thereto are different from each other (e.g. $R_A \neq R_B$ in the above example).

Figure 11:
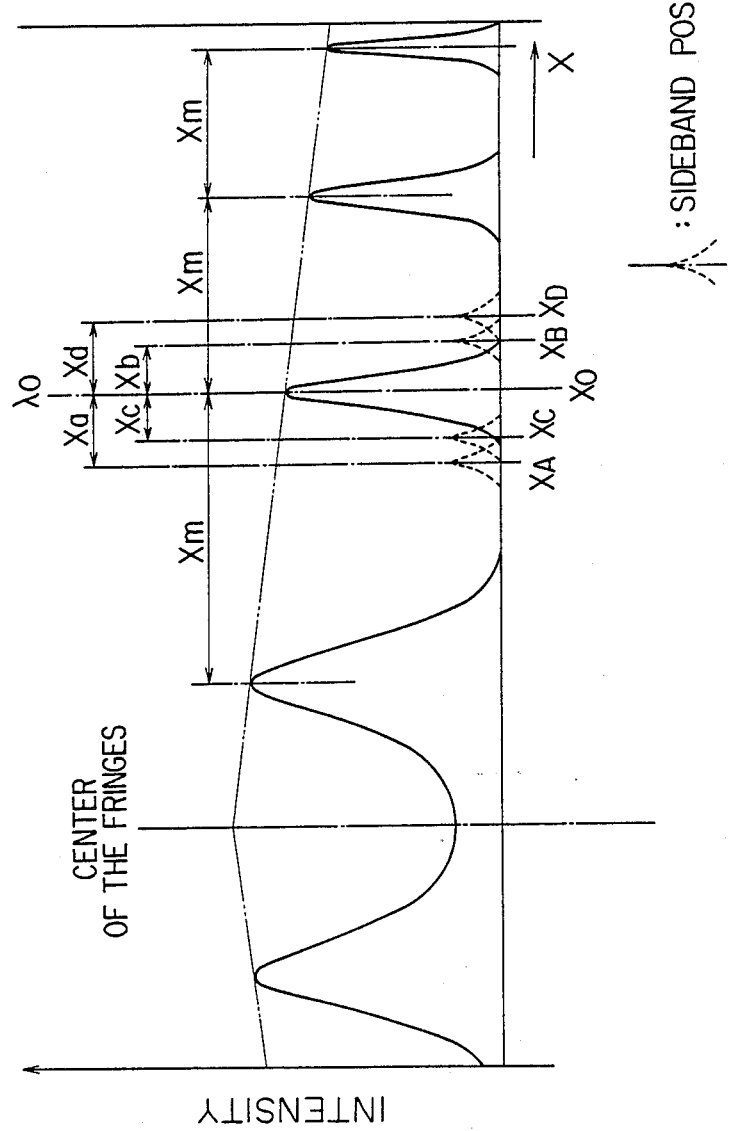
FIG. 11 is a view similar to that of FIG. 9, but showing the relationship between the interference fringes formed by the sideband wavelengths and those formed by the central wavelength of the laser beam generated by the device whose spectral characteristics are shown in FIG. 10.

In the above discussion of the sidband analysis, reference has been made to FIGS. 3(d) to 3(f) and 9, wherein two sideband wavelengths $\lambda_{SA}$ and $\lambda_{SB}$ may appear simultaneously in the laser beam 6. However, sideband wavelengths may appear simultaneously at more than two positions. FIG. 10 shows the case where four sideband wavelengths $\lambda_{SA}$, $\lambda_{SB}$, $\lambda_{SC}$, and $\lambda_{SD}$ may be generated simultaneously in the laser beam 6 outputted from the laser device of FIGS. 4 and 5; FIGS. 10 (a) and 10 (b) show the transmission characteristics of the coarse and the fine tuning etalons 4 and 5, while FIG. 10 (c) shows the transmission characteristics which result from the combination of the two etalons 4 and 5; since the laser gain profile is extended as shown at FIG. 10 (d), four sideband wavelengths $\lambda_{SA}$, $\lambda_{SB}$, $\lambda_{SC}$, and $\lambda_{SD}$ may be generated simultaneously in the laser output 6, as shown at FIG. 10 (e). These sideband wavelengths $\lambda_{SA}$, $\lambda_{SB}$, $\lambda_{SC}$, and $\lambda_{SD}$ are associated with i= −6, −1, +1, and +6, respectively. As shown in FIG. 11, these sideband wavelengths $\lambda_{SA}$, $\lambda_{SB}$, $\lambda_{SC}$, and $\lambda_{SD}$ form interference fringe peaks on the image sensor 24 at positions $X_A$, $X_B$, $X_C$, and $X_D$ separated by distances Xa, Xb, Xc, and Xd from the peak position $X_O$ of the interference fringes formed by the central wavelength $\lambda_O$ of the laser beam 6. These distances Xa, Xb, Xc, and Xd correspond to the apparent wavelength differences $R_A$, $R_B$, $R_C$, and $R_D$ between the sideband wavelengths $\lambda_{SA}$, $\lambda_{SB}$, $\lambda_{SC}$, and $\lambda_{SD}$ and the central wavelength $\lambda_O$. These sideband wavelengths $\lambda_{SA}$, $\lambda_{SB}$, $\lambda_{SC}$, and $\lambda_{SD}$ form fringe peaks distinct from each other and from those of the central wavelength $\lambda_O$ if and only if the apparent wavelength differences $R_A$, $R_B$, $R_C$, and $R_D$ are all different from 0 and different from each other.

Figure 12:
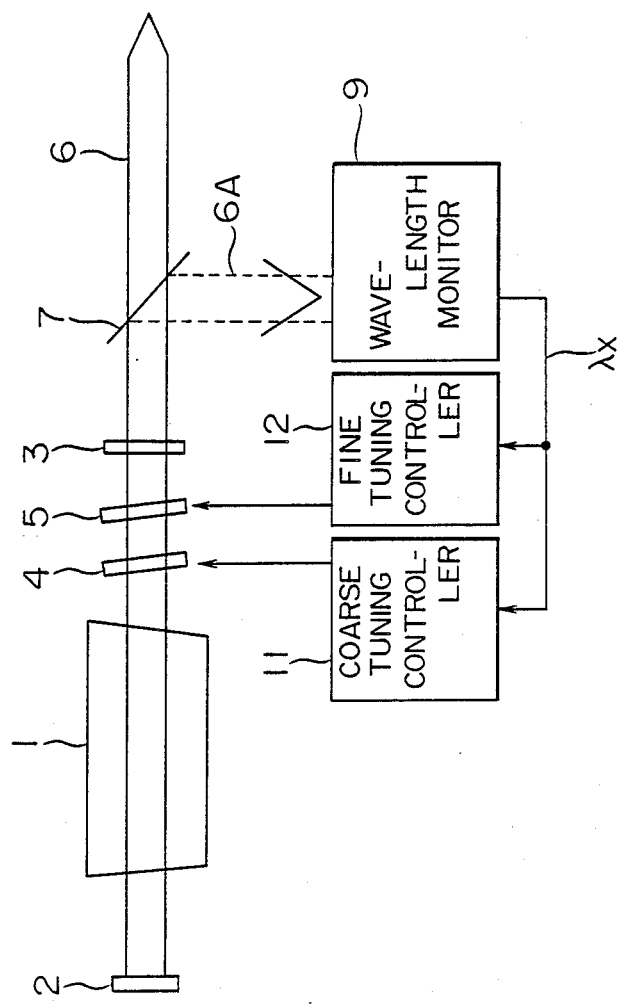
FIG. 12 is a block diagram showing the organization of a laser device with sideband detection capability.

In the case where sideband wavelength detection is effected by the wavelength monitor 9, the coarse tuning servo mechanism 11 may drive the coarse tuning etalon 4 in response to the wavelength information $\lambda x$ outputted from the wavelength monitor 9 which contains information concerning the sideband wavelengths. Thus, FIG. 12 shows in a schematic manner the organization of a laser device with sideband detection capability. In FIG. 12, the coarse tuning controller 11 and fine tuning controller 12 are supplied with wavelength information $\lambda x$ outputted from the wavelength monitor 9 which detects the sideband wavelengths. The wavelength monitor 9 detects the positions $X_S$ of the fringe peaks formed by the sideband wavelengths $\lambda_S$ as well as the position X of the peaks formed by the central wavelength of the laser beam 6, and outputs wavelength information $\lambda x$ corresponding to these positions $X_S$ and X. The fine tuning controller 12 controls the fine tuning etalon 5 in response to the wavelength information $\lambda x$, so that the fringe peaks formed by the central wavelength of the laser beam 6 will coincide with the setting or target positions $X_O$ corresponding to the setting wavelength $\lambda_O$. On the other hand, the coarse tuning controller 11 adjusts the coarse tuning etalon 4 in response to the wavelength information $\lambda x$ and the output power information form the output power monitor (not shown in FIG. 12) similar to the monitor 10 of FGI. 4.

(E) Method of Operation with Sidebands Analysis

Figure 13:
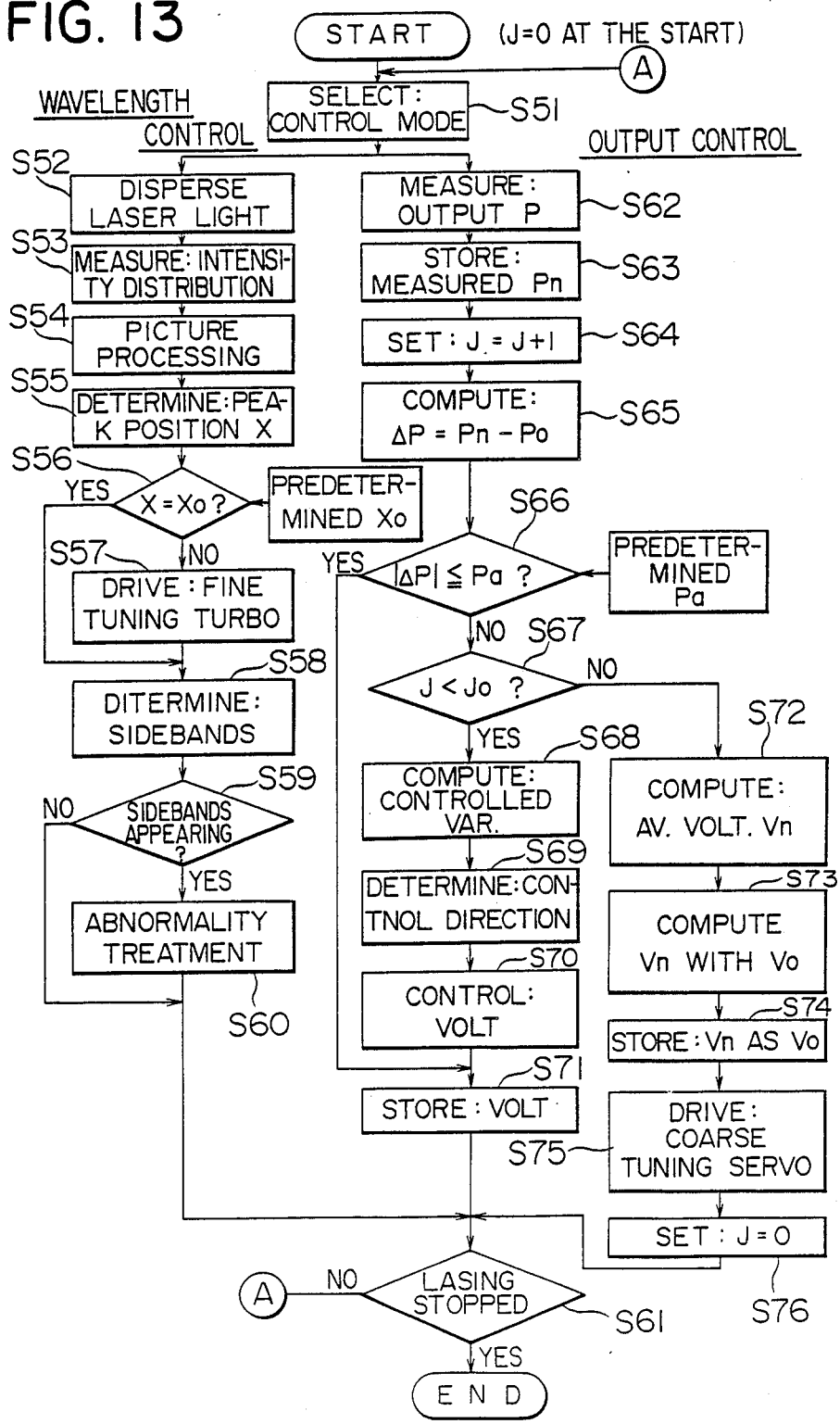
FIG. 13 is a flowchart showing the steps followed in controlling a laser device capable of sideband detection.

FIG. 13 shows a wavelength and output power control procedure for a laser device which is capable of the sideband wavelength detection as described above. The steps shown in FIG. 13 may be used as the wavelength and output power control steps in the procedure of FIG. 7a (for example, as step S10 of FIG. 7a) instead of the steps shown in FIG. 7b. The steps of FIG. 7a may be used as they are in the operation of a laser device with sideband detection capability as described above; in such case, however, the (pressure) search steps S5 and S6 of FIG. 7a may be modified as follows. Namely, as can be easily inferred from the description above in reference to FIGS. 3(a) to 3(f), sideband wavelength appear when the pressure between the inner surface of the coarse tuning etalon 4 or the angle thereof with respect to the optical axis of the optical cavity is varied. Thus, at step S5, the controller 13 automatically varies the inner pressure, etc., of the coarse tuning etalon 4 over a predetermined range, wherein the generation of sideband wavelengths are detected and monitored by the wavelength monitor 9. The controller 13 thus dertermines the optimum distance $d_1$ between the silvered surfaces of the etalon 4 or the optimum angle of incidence $\theta_1$ of the laser beam 6 thereto, at which the transmission peak of the coarse tuning etalon coincide with the setting wavelength $\lambda_O$ of the laser beam 6. Further, at step S6, the pressure or the angle of the coarse tuning etalon 4 is set at the optimum value thereof which is determined at the previous step S5.

Let us now describe the wavelength and output power control procedure shown in FIG. 13. In the description, reference is made to FIGS. 4 and 5, in addition to the figures mentioned specifically.

First, at step S51 corresponding to step S11 of FIG. 7a, one of the two control modes, the wavelength control or the output power control mode, is selected. The wavelength and the output power control may be executed selectively by division of time, or alternatively, they may be executed simultaneously.

When the wavelength control is selected at step S51, steps S52 through S57 are performed to adjust the fine tuning etalon 5. These steps S52 through S57 correspond and are similar to steps S12 through S17 of FIG. 7b. Following step S57 at which the fine tuning etalon 5 is adjusted, or following step S56 in the case where the peak position or distance X determined at step S55 is equal to the predetermined value $X_O$, sideband outputs are detected at step S58; namely, the image processor 25 of the wavelength monitor 9 analyses the linear intensity distribution of the interference fringes formed on the image sensor 24, and determines whether small peaks corresponding to sideband wavelengths are present or not. This determination of the sideband wavelengths may be effected by detecting the intensity of the fringes on the image sensor 24 at positions $X_S$ (such as $X_A$ and $X_B$ in FIG. 9 or $X_A$ through $X_D$ in FIG. 11) corresponding to the sideband wavelengths $\lambda_S$ (such as $\lambda_{SA}$ and $\lambda_{SB}$ in FIGS. 3(d) to 3(f) or $\lambda_{SA}$ through $\lambda_{SD}$ in FIG. 10) which may be generated in the laser beam 6. Next, at step S59, it is decided whether sidebands are present or not; the decision may be made, for example, by comparing with a predetermined reference level the output levels of the image sensor 24 at the positions $X_S$ corresponding to the sideband wavelengths $\lambda_S$. When it is decided at step S59 that there are no sideband wavelengths in the laser beam 6, the program proceeds directly to step S61, at which a determination is made as to whether lasing has stopped or not. On the other hand, when it is decided at step S59 that there are sideband wavelengths in the laser beam 6, the abnormality treatment procedure is effected at S60; namely, the abnormal performance of the coarse tuning etalon 4 is corrected so that its transmission peak will agree with the setting wavelength $\lambda_O$ of the laser beam 6. After the abnormality is treated at step S60, the program proceeds to steps S61. When it is determined at step S61 that lasing has not stopped, the program returns to step S51 to renew the wavelength or the output power control steps.

On the other hand, when the output power control is selected at step S51, the following procedure is followed.

At steps S62 through S66 corresponding to the steps S19 through S22 of FIG. 7b, the current laser output power Pn is determined (steps S62 and S63) and the absolute value of its error ΔP with respect to the target level $P_O$ (calculated at step S65) is compared with an allowable error range Pa (step S66). At step S64, however, the value of a parameter J indicating the number of output power level measurement cycles effected at steps S62 and S63 is increased by 1.

When the absolute value of the error $\Delta P$ is determined at step S66 to be not greater than the allowable errorr range Pa, the program proceeds to steps S71, at which the current voltage level applied across the laser medium 1 is stored. When, on the other hand, the absolute value of the error $\Delta P$ is determined at step S66 to be greater than the allowable error range Pa, a determination is made at step S67 as to whether the value of the parameter J is equal to or smaller than a predetermined number $J_O$, so as to determine which one of the two output power controls, the control of the voltage applied across the laser medium 1 or the control of the coarse tuning etalon 4, is to be effected subsequently.

When it is determined at step S67 that J is smaller than $J_O$, the voltage applied across the laser medium 1 is controlled at steps S68 through S70 which correspond to steps S24 through S26 of FIG. 7b. Further, at step S71, the value of the applied voltage is stored at step S71.

On the other hand, when it is determined at step S67 that J is equal to $J_O$, the average Vn of the preceeding ($J_O$—1) values of the applied voltage which were stored at step S71 in the voltage control cycles before the current step S72 is taken. Further, at step S73, the current value of the average Vn is compared with the previous value of the average $V_O$ (which is stored at step S74 of the previous cycle, as desribed below) to determine the (absolute) value of the controlled variable and the control direction of the coarse tuning etalon 4; the determination is effected, for example, in such a manner that the voltage applied across the laser medium 1 shall be minimized by the variation of the controlled variable. Next, at step S74, the current value of Vn is stored as the value of $V_O$ which is utilized at the next cycle. Further, at step S75, the controller 13 outputs the coarse tuning command signal C in accordance with the value of the controlled variable and the control direction determined at step S73; thus, the coarse tuning servo mechanism 11 drives the coarse tuning etalon 4 in response thereto at the same step S75. Then, after the value of the parameter J is reset to 0 at step S76, the program proceeds to step S61.

While we have described and shown the particular embodiments of this invention, it will be understood that many modifications may be made without departing from the spirit thereof.

For example, in the above embodiments, the control of the output power level of the laser beam has been effected by the adjustment of the voltage applied across the laser bean as well as by the adjustment of the intracavity coarse tuning etalon; this invention, however, is applicable to the ase where the output power is controlled by the adjustment of the coarse tuning etalon alone. Further, although the wavelength monitor of the laser device described under the heading (A) comprises an image processor which removes noise components and determines a peak position of the interference fringes formed on a linear image sensor, this invention is applicable to laser devices whose wavelength monitor does not comprise such an image processor. For example, the wavelength monitoring may be effected as follows: Instead of an image sensor consisting of a linear array of photodetectors, a single photosensitive element may be disposed at the position $X_O$, shown in FIG. 6, corresponding to the central wavelength $\lambda_O$ of the laser beam; the adjusted parameter, such as the separation d between the silvered surfaces, of the fine tuning etalon 5 is varied over a predetermined range in the neighborhood of the optimum position; from the variation of the intensity of light incident on the photosensitive element at $X_O$, the optimum value of the parameter of the fine tuning etalon 5 is determined, and the fine tuning etalon 5 is controlled accordingly. Further, the method described under the headings (B) and (C) may be combined, so that the system starting preparatory steps according to (B) and the thermal adjustment of the controlled variables of the intracavity etalons during laser oscillation pauses, according to (C), may be effected in combination. Further, the above embodiments concern with the case in which the laser device comprises two intracavity etalons; however, this invention is applicable to laser devices comprising three or more intracavity etalons. In such case, the etalon with the smallest free spectral region FSR corresponds to the fine tuning etalon 5 of the laser device described above. Furthermore, although in the case of the wavelength monitor 9 shown in FIG. 5, a portion of the laser beam 6A split by the beam splitter 7 is guided directly thereto, it may be guided thereto via an optical fiber, so that design limitations on the wavelength monitor may be removed.

Thus, we contemplate by the appended claims to cover any such modifications as fall within the true spirit and scope of this invention.

What is claimed is:

1. A method of controlling a laser device having an oscillator optical cavity for generating a laser beam, and means for controlling the wavelength and output power of the laser beam generated by the oscillator optical cavity, comprising:
    (a) initializing parameters of the laser device before a laser oscillation of the oscillator optical cavity is started afresh, said parameters including a parameter K which takes a first and a second value indicating a cold and a hot state of the laser device, respectively, wherein the value of parameter K is set at the first value indicative of the cold state of the laser device at the initializing step (a);
    (b) determining whether the laser device is in the hot or the cold state from a current value of said parameter K;
    (c) starting the laser oscillation and preparing the laser device for supplying the laser beam to an exterior optical system when the laser device is determined to be in a cold state at said device state determining step (b), wherein, before supplying the laser beam generated by the laser device to the exterior optical system, the wavelength and the output power level of the laser beam generated by the laser device are controlled to a predetermined wavelength and a predetermined target output power level, respectively, by said means for controlling;
    (d) setting said parameter K at the second value indicative of a hot state of the laser device when the wavelength and the output power level of the laser beam generated by the laser device are controlled to the predetermined wavelength and the predetermined target output power level, respectively, whereat the laser beam generated by the laser device begins to be supplied to the exterior optical system to be utilized therein:

(e) controlling the wavelength and the output power of the laser beam, generated and supplied by the laser device, to the predetermined wavelength and the predetermined target output power level, respectively, by said controlling means, wherein the controlling step (e) directly succeeds said state determining step (b) omitting steps (c) and (d) when the laser device is determined to be in the hot state at said state determining step (b);

(f) determining, when the laser oscillation is stopped, a time length during which the laser oscillation is stopped;

(g) resetting said parameter K to the first value indicative of the cold state of the laser device when the time length determined at said time determining steps (f) exceeds a predetermined time length; and (h) repeating said time determining step (f) and said parameter resetting step (g), to reset said parameter K to the first value indicative of the cold state of the laser device whenever the time during which the laser oscillation has been stopped exceeds said predetermined time length, wherein, when laser oscillation is restarted without a power source to the laser device being turned off, said state determining step (b) is resumed, to be succeeded directly by said controlling step if the value of the parameter K is not reset to the first value indicative of the cold state of the laser device at the repeating step (h).

2. A method of controlling a laser device as claimed in claim 1 wherein the laser device comprises at least two intracavity etalons, a coarse and a fine tuning etalon, as spectral narrowing elements, and the wavelength of the laser beam generated by the laser device is controlled to the predetermined wavelength by adjusting a parameter of the intracavity fine tuning etalon in said starting and preparing step (c) and said controlling step (e).

3. A method of controlling a laser device as claimed in claim 1 wherein the laser device comprises at least two intracavitiy etalons, a coarse and a fine tuning etalon, as spectral narrowing elements, and the output power level of the laser beam generated by the laser device is controlled to a predetermined target level by adjusting a parameter of the intracavity coarse tuning etalon in said starting and preparing step (c) and said controlling step (e).

4. A method of controlling a laser device as claimed in claim 2 wherein said parameter of the intracavity fine tuning etalon is a separation between reflective surfaces thereof.

5. A method of controlling a laser device as claimed in claim 3 wherein said parameter of the intracavity coarse tuning etalon is the separation between reflective surfaces thereof.

6. A method of controlling a laser device as claimed in claim 3 wherein said parameter of the intracavity coarse tuning etalon is varied in said starting and preparing step (c) in a predetermined range to determine an optimum value of said parameter of the intracavity coarse tuning etalon.

7. A method for controlling a laser device including an oscillator optical cavity for generating a laser beam, at least two cavity etalons, a course and a fine tuning etalon, disposed in said oscillator optical cavity as spectral narrowing elements, and means for controlling a parameter of the fine and coarse tuning etalon comprising:

(a) initializing parameters of the laser device before a laser oscillation is started afresh, said parameters including a parameter K which takes a first and a second value indicating a cold and a hot state of the laser device, respectively, wherein the value of parameter K is set at the first value indicative of the cold state of the laser device at the initializing step (a);

(b) starting a laser oscillation of the oscillator optical cavity;

(c) controlling the wavelength of the laser beam generated by the laser device to a predetermined wavelength, wherein the wavelength of the laser beam is controlled by adjustment of said parameter of the fine tuning etalon by said means for controlling;

(d) controlling the output power level of the laser beam generated by the laser device to a target output power level wherein the output power level of the laser beam is controlled by adjustment of said parameter of the coarse tuning etalon by said means for controlling;

(e) determining a current value of the parameter K;

(f) setting the parameter K, if the current value of the parameter K determined at step (e) is equal to the first value indicative of the cold state of the laser device, to said second value indicative of the hot state of the laser device when the wavelength of the laser beam is controlled to the predetermined wavelength wherein an initial value Yo of a controlled variable with respect to said parameter of the fine tuning etalon is stored;

(g) calculating a current total value Y of a controlled variable with respect to said parameter of the fine tuning etalon in said wavelength controlling step (C);

(h) calculating a current total value Z of a controlled variable with respect to said parameter of the coarse tuning etalon in said output power controlling step (d);

(i) determining, when the laser is stopped, the time length during which the laser oscillation has been stopped;

(j) determining respective adjustment values Ay and Az of the controlled variables of the fine and coarse tuning etalons corresponding to the stopped time length determined at the time length determining step (i) wherein said adjustment values Ay and Az of the controlled variables correspond to deformantions of the fine and coarse tuning etalons caused by decreases in the temperatures of the etalons during the time when the laser oscillation is stopped;

(k) adjusting said parameters of the fine and coarse tuning etalons with said means for controlling in accordance with the respective adjustment values Ay and Az of the controlled variable with respect thereto determined at said adjustment value determining step (j);

(l) repeating said time length determining step (i), said adjustment value determining step (j), and said parameter adjusting step (k), during a time in which the laser oscillation is stopped, for continually adjusting said parameters of the fine and the coarse tuning etalon in accordance with the decreases in the temperatures of the etalons during the time in which the laser oscillation has stopped;

(m) adjusting, when the time determined at said time determining step (i) is not greater than a predetermined length of time, the current total values Y and Z of the controlled variable of the fine and coarse tuning etalons, before restarting the laser oscillation, on the basis of said initial value Yo, determined at the step (f) immediately preceding the current step (m), and the adjustment values Ay and Az of the controlled variables of the fine and the coarse turning etalons determined at the adjustment value determining step (j) immediately preceding the current step (m); and (n) resetting, before restarting the laser oscillation, said parameter K to said first value indicative of the cold state of the laser device when the time determined at the preceding stopped time determining step (i) exceeds the predetermined length of time.

8. A method for controlling a laser device including an oscillator optical cavity for generating a laser beam, at least two intracavity etalons, a course and a fine tuning etalon, as spectral narrowing elements, and means for controlling a parameter of the fine and coarse tuning etalons comprising:

initializing parameters of the laser device before the laser oscillation is started afresh;

starting the laser oscillation in the laser oscillator optical cavity;

controlling the wavelength of the laser beam generated by the laser device to a predetermined wavelength wherein the wavelength of the laser beam is controlled by adjustment of the parameter of the fine tuning etalon by said means for controlling;

controlling the output power level of the laser beam generated by the laser device to a target output power level wherein the output power level of the laser beam is controlled by adjustment of the parameter of the coarse tuning etalon by said means for controlling;

continually adjusting the parameters of the fine and coarse tuning etalons, during an interval of time in which the laser oscillation is stopped, to values corresponding to decreases in the temperatures of the fine and the coarse tuning etalons, respectively; and adjusting, when the laser oscillation is restarted after an interval of time which is shorter than a predetermined length of time, total values of controlled variables with respect to the parameters of the fine and coarse tuning etalons to values corresponding to the decreases in the temperatures of the fine and coarse tuning etalons, respectively, wherein the parameters of the fine and coarse tuning etalons are initialized before restarting the laser oscillation when the interval of time during which the laser oscillation has been stopped is longer than said predetermined length of time wherein the wavelength and the output power level controlling steps are resumed after restarting the laser oscillation.

9. A method of controlling a laser device as claimed in claim 7 wherein said adjustment values Ay and Az determined at step (j) are expressed as exponential functions of the time length determined at step (i), with respective thermal time constants.

10. A method of controlling a laser device as claimed in claim 8 wherein the parameters of the fine and the coarse tuning etalons are adjusted at said parameter adjusting step on the basis of exponential functions of said interval of time with predetermined thermal time constants.

11. A method of controlling a laser device as claimed in claim 7 wherein said parameters of the fine and the coarse tuning etalons are separations between partially reflective surfaces thereof.

12. A method of controlling a laser device as claimed in claim 8 wherein said parameters of the fine and coarse tuning etalons are separations between partially reflective surfaces thereof.

13. A laser device for outputting a laser beam comprising:

an osilator optical cavity having a laser medium disposed therein for generating a laser beam;

a coarse tuning spectral narrowing element disposed in said osicllator optical cavity;

an etalon disposed in said oscillator optical cavity as a fine tuning spectral narrowing element;

coarse tuning controller means for controlling a spectral narrowing characteristics of said coarse tuning spectral narrowing element;

fine tuning controller means for controlling wavelength transmission characteristics of said fine tuning etalon; and wavelength monitor means for detecting wavelengths of the laser beam generated in the oscillator optical cavity, said wavelength monitor means including: a monitor etalon to which a portion of the laser beam generated by the oscillator optical cavity is guided, and an image sensor on which interference fringes corresponding to wavelengths of the laser beam is formed by said portion of the laser beam guided to the monitor etalon wherein the free spectral region (FSRm) of the monitor etalon and the free spectral region (FSR) of the fine tuning etalon are selected at values at which apparent wavelength differences, with respect to the interference fringes formed on said image sensor of the wavelength monitor, between sideband wavelengths that may be generated in the laser beam and a central setting wavelength of the laser beam are rendered substantially different from zero, so that sideband wavelengths corresponding to transmission peaks of the fine tuning etalon deviated from the central wavelength of the laser beam may be detected via the interference fringes formed on the image sensor of the wavelength monitor, the coarse and the fine tuning controller controlling the coarse tuning spectral narrowing element and the fine tuning etalon in response to an output of the wavelength monitor means, which output includes information on sideband wavelengths as well as the central wavelengths of the laser beam.

14. A laser device for outputting a laser beam as claimed in claim 13 wherein the free spectral region (FSRm) of the monitor etalon and the free spectral region (FSR) of the fine tuning etalon are selected at values at which said apparent wavelength differences between sideband wavelengths and the central setting wavelength of the laser beam are substantially different from each other, so that sideband wavelengths may be detected separately from each other via the interference fringes formed on the image sensor of the wavelength monoitor.

15. A laser device as claimed in claim 13, wherein said apparent wavelength difference R between a sideband wavelength $\lambda_S$ and the central wavelength $\lambda_O$ of the laser beam is expressed by the equation:

$$R = i \times FSR + j \times FSRm,$$

wherein FSR is the free spectal region of the fine tuning etalon, FSRm is the free spectral region of the monitor etalon of the wavelength monitor, i is an integer associated with the sideband wavelength $\lambda_S$ by means of the equation: $\lambda_S = \lambda_O + i \times FSR$, and j is an integer which minimizes the ablsolute value of R.

16. A laser device as claimed in claim 13, wherein said coarse tuning spectral narrowing element is a coarse tuning etalon having a free spectral region and a half width of transmission peaks which are wider than those of the fine tuning etalon.

17. A laser device as claimed in claim 14 wherein said apparent wavelength difference R between a sideband wavelength s and the central wavelength o of the laser beam is expressed by the equation:

$$R = i \times FSR + j \times FSRm$$

wherein FSR is the free spectral region of the fine tuning etalon, FSRm is the free spectral region of the monitor etalon of the wavelength monitor, i is an integer associated with the sideband wavelength s by means of the equation: $s = o + i \times FSR$, and j is an interger which minimizes the absolute value or R.

18. A laser device as claimed in claim 14 wherein said coarse tuning spectral narrowing element is a coarse tuning etalon having free spectral region and a half width of transmission peaks which are wider than those of the fine tuning etalon.

19. A method of controlling a laser device comprising an oscillator optical cavity having a laser medium disposed therein for generating a laser beam, a coarse tuning spectral narrowing element disposed in said oscillator optical cavity, an etalon disposed in said oscillator optical cavity as a fine tuning spectral narrowing element, coarse tuning controller means for controlling spectral narrowing characteristics of said coarse tuning spectral narrowing element, fine tuning controller means for controlling wavelength transmission characteristics of said fine tuning etalon, and wavelength monitor means for detecting wavelengths of the laser beam generated in the oscillator optical cavity, the wavelength monitor means including a monitor etalon to which a portion of the laser beam generated in the oscillator optical cavity is guided and an image sensor on which interference fringes corresponding to wavelengths of the laser beam is formed by said portion of the laser beam guided to the monitor etalon, comprising:

detecting the central and sideband wavelengths of the laser beam generated by the laser device with the wavelength monitor by means of the interference fringes formed by the monitor etalon;

controlling of the fine tuning etalon in response to the detected central wavelength of the laser beam to adjust the central wavelength to a predetermined wavelength; and correcting the spectral characteristics of the coarse tuning spectral element in response to detection of a sideband wavelength in the laser beam.

20. A method of controlling a laser device comprising an oscillator optical cavity having a laser medium disposed therein for generating a laser beam, a coarse tuning spectral narrowing element comprising a coarse tuning etalon, a fine tuning etalon disposed in said oscillator optical cavity as a fine tuning spectral narrowing element, coarse tuning controller means for controlling spectral narrowing characteristics of said coarse tuning spectral narrowing element, fine tuning controller means for controlling wavelength transmission characteristics of said fine tuning etalon, and wavelength monitor means for detecting wavelengths of the laser beam generated in the oscillator optical cavity, the wavelength monitor means including a monitor etalon to which a portion of the laser beam generated in the oscillator optical cavity is guided and an image sensor on which interference fringes corresponding to wavelengths of the laser beam is formed by said portion of the laser beam guided to the monitor etalon, comprising:

detecting the central and sideband wavelengths of the laser beam generated by the laser device with the wavelength monitor by means of the interference fringes formed by the monitor etalon;

controlling the fine tuning etalon in response to the detected central wavelength of the laser beam to adjust the central wavelength to a predetermined wavelength; and correcting the spectral characteristics of the coarse tuning etalon in response to detection of a sideband wavelength in the laser beam.

21. A method of controlling an output power level of the laser beam generated by a laser device including an oscillator optical cavity for generating a laser beam by means of a laser oscillation of a laser medium disposed therein, at least two intracavity etalons, a coarse and a fine tuning etalon, disposed in said oscillator optical cavity as spectral norrowing elements, means for controlling a parameter of the fine and the coarse tuning etalons, and means for controlling a voltage applied across a laser medium in said oscillator optical cavity, said method comprising:

(a) measuring the output power level of the laser beam generated by the laser device;

(b) controlling the voltage applied across the laser medium in response to the measured output power level of the laser beam, to adjust the output power level to a predetermined level;

(c) repeating said voltage controlling step a predetermined number of times, wherein an average of the applied voltages is calculated;

(d) controlling said parameter of the coarse tuning etalon, after said voltage controlling steps are repeated said predetermined number of times, in such manner that the average of the applied voltages calculated at a current control cycle is reduced with respect to the average calculated at a preceeding control cycle, thereby minimizing the voltage applied across the laser medium; and (e) repeating steps (b) through (d), to control the output power level of the laser beam to the predetermined level, while minimizing the voltage applied across the laser medium.

* * * * *

UNITED STATES PATENT AND TRADEMARK OFFICE
CERTIFICATE OF CORRECTION

PATENT NO. : 4,947,398

DATED : August 7, 1990

INVENTOR(S) : Yasuda et al.

It is certified that error appears in the above-identified patent and that said Letters Patent is hereby corrected as shown below:

Column 26, line 34, delete ",".

Column 27, line 43, change "intracavitiy" to --intracavity--;
          line 52, change "a" to --the--.

Column 28, line 44, after "laser" insert --oscillation--.

Column 30, line 17, change "osicllator" to --oscillator--.

Column 31, line 20, change "s" to -- $\lambda_s$ --;
          line 20, change "o" to -- $\lambda_o$ --;
          line 29, change "s" to -- $\lambda_s$ --;
          line 31, change "or" to --of--.

Column 32, line 57, after "such" insert --a--.

Signed and Sealed this

Twenty-first Day of January, 1992

Attest:

HARRY F. MANBECK, JR.

*Attesting Officer*      *Commissioner of Patents and Trademarks*